US008578338B2

(12) United States Patent
Nguyen

(10) Patent No.: US 8,578,338 B2
(45) Date of Patent: Nov. 5, 2013

(54) GAME PRODUCTION AND REGULATORY APPROVAL SYSTEMS

(75) Inventor: Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 1079 days.

(21) Appl. No.: 12/131,737

(22) Filed: Jun. 2, 2008

(65) Prior Publication Data

US 2009/0298576 A1 Dec. 3, 2009

(51) Int. Cl.
*G06F 9/44* (2006.01)
*G06Q 99/00* (2006.01)

(52) U.S. Cl.
USPC .......................................... 717/126; 717/121

(58) Field of Classification Search
USPC .................................. 717/121, 126; 705/317
See application file for complete search history.

(56) References Cited

U.S. PATENT DOCUMENTS

| | | | | |
|---|---|---|---|---|
| 3,931,504 | A | 1/1976 | Jacoby | |
| 4,430,728 | A | 2/1984 | Beitel et al. | |
| 4,454,594 | A | 6/1984 | Heffron et al. | |
| 5,568,602 | A | 10/1996 | Callahan et al. | |
| 5,643,086 | A | 7/1997 | Alcorn et al. | |
| 5,761,647 | A | 6/1998 | Boushy | |
| 5,851,149 | A | 12/1998 | Xidos et al. | |
| 5,971,851 | A | 10/1999 | Pascal et al. | |
| 6,099,089 | A | 8/2000 | Schneider et al. | |
| 6,104,815 | A | 8/2000 | Alcorn et al. | |
| 6,106,396 | A | 8/2000 | Alcorn et al. | |
| 6,149,522 | A | 11/2000 | Alcorn et al. | |
| 6,219,836 | B1 * | 4/2001 | Wells et al. | 717/178 |
| 6,253,374 | B1 | 6/2001 | Dresevic et al. | |
| 6,290,602 | B1 | 9/2001 | Kawano | |
| 6,331,146 | B1 | 12/2001 | Miyamoto et al. | |
| 6,446,257 | B1 | 9/2002 | Pradhan et al. | |
| 6,449,687 | B1 | 9/2002 | Moriya | |
| 6,453,319 | B1 | 9/2002 | Mattis et al. | |
| 6,454,648 | B1 | 9/2002 | Kelly et al. | |
| 6,565,443 | B1 * | 5/2003 | Johnson et al. | 463/43 |
| 6,908,391 | B2 | 6/2005 | Gatto et al. | |
| 6,928,328 | B2 * | 8/2005 | Deitz et al. | 700/87 |

(Continued)

FOREIGN PATENT DOCUMENTS

| | | |
|---|---|---|
| EP | 1 255 234 | 11/2002 |
| WO | WO 02/073501 | 9/2002 |
| WO | WO 03/023647 | 3/2003 |
| WO | WO 2004/051588 | 6/2004 |

OTHER PUBLICATIONS

Robeson, David J., "Accelerated Examination at the USPTO: Procedure", The Disclosure, Jan. 2007, 6pg.*

(Continued)

*Primary Examiner* — Li B Zhen
*Assistant Examiner* — Ryan Coyer
(74) *Attorney, Agent, or Firm* — Foley & Lardner LLP

(57) ABSTRACT

Methods and systems for creating, producing, and submitting new wager game packages for approval from regulatory bodies. A game development system includes a creative environment, a production environment, and a submission environment. In the creative environment, new wager game code is developed using pre-approved game components and other components provided by the game provider/publisher. In the production environment, the game code is tested and converted to operate in multiple platforms, to meet the requirements of various jurisdictions, and the like. In the submission environment, the game code and various submission documents are bundled into a game package for submission to a regulatory body.

38 Claims, 15 Drawing Sheets

(56) References Cited

U.S. PATENT DOCUMENTS

| | | | | |
|---|---|---|---|---|
| 2002/0103869 | A1 * | 8/2002 | Goatly et al. | 709/206 |
| 2002/0104006 | A1 * | 8/2002 | Boate et al. | 713/186 |
| 2002/0116284 | A1 | 8/2002 | Steelman et al. | |
| 2003/0064808 | A1 * | 4/2003 | Hecht et al. | 463/42 |
| 2003/0069074 | A1 * | 4/2003 | Jackson | 463/43 |
| 2003/0078103 | A1 | 4/2003 | LeMay et al. | |
| 2004/0106452 | A1 * | 6/2004 | Nguyen et al. | 463/42 |
| 2006/0111111 | A1 * | 5/2006 | Ovadia | 455/439 |
| 2008/0045342 | A1 * | 2/2008 | Crowder et al. | 463/42 |
| 2008/0102919 | A1 * | 5/2008 | Rowe et al. | 463/18 |
| 2008/0254893 | A1 * | 10/2008 | Patel et al. | 463/42 |

OTHER PUBLICATIONS

U.S. Office Action dated Dec. 23, 2005 issued in U.S. Appl. No. 10/308,845.

U.S. Final Office Action dated Jun. 2, 2006 issued in U.S. Appl. No. 10/308,845.

U.S. Office Action dated Dec. 13, 2006 issued in U.S. Appl. No. 10/308,845.

PCT International Search Report dated Apr. 23, 2004 issued in PCT/US03/037613.

Australian Examiner's first report dated Feb. 20, 2009 issued in AU 2003293029.

Russian Office Action dated Jul. 19, 2008 issued in RU 2005/118989/09.

Bernardi, et al., (Jun. 10-14, 2002) "Model Design Using Hierarchical Web-Based Libraries",*Annual ACM IEEE Design Automation Conference*, New Orleans, Louisiana, pp. 14-17.

Levinthal et al., (Feb. 1997) "The Silicon Gaming Odyssey Slot Machine", COMPCON '97 Proceedings, *IEEE* San Jose, CA; *IEEE Comput,* S, 6 pages.

* cited by examiner

GAME PRODUCTION AND REGULATORY APPROVAL SYSTEMS

BACKGROUND OF THE INVENTION

1. Field of the Invention

The present invention relates to the wager gaming industry, and more specifically to methods and systems for streamlining the process of developing wager games and obtaining regulatory approval for new games in an online environment.

2. Description of the Related Art

The wager gaming industry, especially gaming machine and gaming network, has been experiencing some significant technology advances in recent years. New gaming machine platforms and server-based gaming have fueled the need for a greater library of wager games. Sever-based gaming networks, especially has shortened the life cycles of games, as described below, after the discussion of new gaming machine platforms.

When a new video gaming machine platform is introduced by a wager gaming machine provider to a gaming establishment, the provider often touts the improved technical features of the new platform. They impress upon the customer features such as advanced hardware, graphics, and networking capabilities. However, gaming establishments, such as casinos, are often more focused on how their customers, the game players, will react to the new gaming machine. They are keenly aware that what is important to the users of the machines is the variety, quality, and number of games being offered by the machine, more so than the machines technical and engineering advancements. The number of games and necessary software that is available for game play on the new machine platform must be sufficiently high to attract gamers. Casinos gaming operators and their technical staff may appreciate the advanced hardware and networking capabilities of a new platform, for example, but players are almost entirely focused on what games they can play on the new machines and this focus, in turn, largely dictates whether a new machine platform will eventually have widespread acceptance in the gaming industry. New gaming platforms and machines need a large library of games to be financially feasible to casinos.

One technique gaming machine providers (who typically also provide or publish wager game software) have used to address the issue of the quantity and variety of wager games is to alter or modify only specific aspects of existing games or games that run on older or current platforms, i.e., ones that are familiar to game players and may have been successful. The games can be updated or upgraded to take advantage of the new platform. For example, the graphics, sounds, interface, and other external and user-related features, sometimes referred to as the "skins" of older games can be replaced or modified to take advantage of the new platform. The modified "new" game software offers upgraded visual and audio aspects may be inserted into a new gaming platform template and execute on the new machine. Much of the underlying game logic, as well as numerous other components that make up the game, does not need to change. Another technique is "backward" compatibility approach where an emulation engine is utilized to emulate the older or existing platform on the new machine, thereby enabling existing games to execute on the new gaming machine. Neither of these solutions is a practical long-term solution to creating a consistently growing library of wager games for new gaming machine platforms. They are essentially superficial fixes to a more complex issue and, moreover, both fall short of taking full advantage of the technical, user-related, and engineering advancements of the new gaming platform. The problem of limited growth of a game library will be even more acute with server-based gaming paradigm. With the advent of server-based gaming networks, gaming operators can change games on a gaming machine more efficiently than before. For example, the gaming operator can take off or "peel" the skin of a game and put on a new one. The consequence is that the lifecycles of games have shortened significantly or is expected to. In some cases where games had 7 to 10 year lifecycles, the lifecycles are expected to be reduced to 2 to 3 years or even down to 6 months. The players' interests are moving much faster (similar to the public's interest in new songs given the MP3 music distribution model).

Finally, another issue that arises from having to create a large library of new games is the backlog and time required by many gaming control boards and other wager gaming regulatory bodies to approve new wager games. It is worth noting that the cost of developing a game may be relatively low when compared to the cost of the regulatory process that is carried out by the game providers, a process that is essential in getting a game to the marketplace. Even with game providers informing regulators or GCBs that only certain aspects of a game module submitted for approval have changed and that the vast majority of the game module components has remained the same, such as the random number generator, game logic, operating system code, pay tables, and so on, the GCB must still manually verify that these components are, in fact, the same. This must be done, for example, regardless of the trustworthy relationship a GCB may have with a reputable game provider with a clean record before the board. Consequently, the game verification process by the GCB still takes significant time and effort by the GCB or regulatory staff, thereby limiting the rate or flow in which new games are introduced to the wager gaming market.

SUMMARY OF THE INVENTION

Methods and systems for facilitating development of new wager games by third-party game developers and for preparing a game package for electronic submission to regulatory bodies, such as gaming control boards ("GCBs"), for approval are described.

Some implementations allow third-party game developers to operate on unified gaming platforms, language protocols, etc. Some implementations provide a development environment abstracted from underlying complex processes associated with game submission to regulatory agencies. This allows an efficient process driven by development tools and resources (e.g., GCBs have different rules, so personalization or customization tools are important), implemented by an entity that has credentials (with the GCBs), knowledge, expertise, and infrastructure to solve inefficiencies associated with a standardized process, that is, a universal platform.

Some such implementations provide a tool-driven, consistent game development environment and a streamlined, electronic submission process that is efficient and beneficial to both the game publisher/provider and the regulatory bodies.

A game provider/publisher may provide environments or spaces in which stages of the game development, production, and submission processes take place. Embodiments of the present invention may involve the actions of three entities: an independent game developer, a game provider/publisher, and a gaming regulatory body. The game developer may be an individual, a small company, and the like, typically with little or no experience creating wagering games for the mass market or preparing game packages for submission and approval by regulatory bodies.

In contrast, the game provider/publisher may be an experienced, credentialed company in the gaming industry with expertise developing wager games, gaming machines, gaming components and networks, and may have extensive knowledge regarding interacting with GCBs and other regulatory bodies worldwide. The third entity is the regulatory body or GCB which receives game packages from the game provider/publisher and has the responsibility of approving wager games for play within the jurisdiction or geographic area for which the regulatory body is responsible.

In one embodiment, the game provider/publisher enables a game developer to develop a new wager game in a creative environment having a workspace managed and operated by the publisher. This creative environment may be accessed by the developer over the Internet or other network and provides the developer with various tools and services to facilitate new game development. The developer may use certain gaming components, such as a random number generator ("RNG"), game logic, symbol libraries, audio and video modules, pay tables, among many other examples, in the game development process. The motivation for providing this library of tools, services, and components to the developer is so that the developer can focus energy and time on actual development of new game concepts, ideas, and the like, or simply focus on developing new audio and visual components (e.g., "skins") for existing games. Once new wager game code has been developed, in one embodiment, the code may be tested for technical feasibility within the creative environment. This testing may be done by the game provider/publisher using methods known in the art. If the game code passes technical feasibility testing, it advances to a production environment.

In some embodiments, the production environment offers numerous services that may be performed on the wager game code following, e.g., a "Software as a Service" (SaaS) model or a Services-Oriented Architecture (SOA) model. Of the numerous services that may be performed on the game code, one may be converting the game code so that the code can be transmitted in one or more different server-based gaming networks commercially available from different gaming manufacturers. Another aspect of the conversion may also be for converting the new game code so that it executes on various types of gaming machines/platforms and devices from different manufacturers.

Another service that may be performed is converting the game code so that it meets the regulations and standards of various regulatory bodies. As is known in the field, gaming regulatory bodies have different rules (mandated by statute or law), guidelines, procedures, and so on, that game submitters must follow when submitting new game packages. Conversion of the code to meet the myriad rules and regulations may be one of the services performed by the game provider/publisher. Another service that may be performed is preparing the new game code for market (or commercial) feasibility testing so that the code may execute on a few gaming machines in an actual casino where patrons make bets using real money or credits. Numerous other services related to wager game production, as described below, may be performed in the production environment.

Once the various production services have been performed, the game code advances to a submission environment where the code is essentially bundled with documentation to form a game package that is ultimately electronically transmitted to one or more GCBs. In the submission environment, various types of documents intended to facilitate or increase the efficiency of the approval process may be generated. For example, in one embodiment, a differences or "deltas" report may be created which shows the differences between the code being submitted and code previously approved by the GCB. Such a report may be used by the GCB to quickly see what changes have been made to components (e.g., pay tables, audio, visuals, symbols, etc.) that the GCB had approved in prior submissions. Another document may be a certificate of compliance in which the game provider/publisher declares or attests to having complied with all the rules and regulations of the GCB with respect to the game package being submitted. These documents and others are intended to help the GCB with the game approval process when receiving game packages from known and credentialed game submitters.

In addition to these document production services, in the submission environment, other services may include generating a digital signature and encrypting the game package before submitting, authenticating the identity of the GCB, and digital certificate/key management. The encrypted game package, comprising the new wager game code (developed in the creative environment and serviced for production in the production environment) and the various documents, may be transmitted to the one or more regulatory bodies.

Another component that may be utilized in the game development and submission process is a master game component library. This database may contain numerous previously approved components. The game developer may have access to some components when developing games. In some implementations, other components may be used solely by the game provider/publisher in the production environment. In one embodiment, the approved components may be organized according to regulatory body (e.g., all components for a specific GCB may stored in one area and/or accessible by one security group or the like). In another embodiment, the components may be organized based on component type, e.g., with a marker for each component indicating which GCBs have approved that component. Various other ways of organizing and storing the gaming components may be used without affecting the goals of the present invention.

Some embodiments provide a wager game creation and regulatory body submission system, comprising: a creative environment in which a third-party game developer develops wager game code; a production environment in which services are performed on the wager game code, wherein the services relate to wager game code conversion, modification of the wager game code for compliance purposes, and wager game code testing; a submission environment in which the wager game code and submission documents are bundled into a game package in preparation for submission to a regulatory body; and a memory for storing a library of regulatory body approved game components.

The creative environment may include a game creation memory area for facilitating wager game code development by the game developer and/or an interface for use by the game developer. The creative environment may include a technical feasibility testing module for performing technical and software engineering tests on the wager game code for operation stability and robustness. The creative environment may include a game creation memory area providing a workspace for the game developer.

The production environment may include a compliance module having a regulation component for ensuring that the wager game code converted for a specific jurisdiction complies with regulations for the specific jurisdiction and/or a standards component for ensuring that the wager game code converted for the specific jurisdiction complies with standards for the jurisdiction. The production environment may include a market feasibility testing module for preparing the wager game code so that the code can be tested in an actual gaming environment. The production environment may include a compatibility module for ensuring that wager game code that has been converted to execute on a specific platform is compatible on the specific platform. The specific platform may be a server-based gaming network.

The third-party game developer may develop wager game code using existing game code components provided by a game provider/publisher. The existing game code components may include components approved by at least one gaming regulatory body and/or components that are proprietary to the game provider/publisher.

The production environment may include a platform conversion module for converting the wager game code so that the code executes on one or more server-based gaming networks. The wager game code may be converted for execution on the one or more server-based gaming networks by a platform conversion network sub-module. The production environment may include a gaming machine conversion module for converting the wager game code so that the code executes on one or more gaming machines in a server-based gaming network. The wager game code may be converted for execution on the one or more gaming machines by a gaming machine conversion sub-module.

The submission environment may include a document production module for creating regulatory body submission documents. For example, one of the submission documents may comprise a differences report showing differences between the wager game code and a plurality of previously approved game components.

A regulatory body submission may comprise a compliance certificate document containing a statement by a game submitter that the game package being submitted complies with the regulations of the regulatory body. The submission environment may include a security module configured for authenticating the regulatory body, thereby ensuring that the game package is being sent to an authorized entity. The submission environment may include a digital certificate management component to ensure that only authorized individuals at the regulatory body can decrypt the game package. The wager game production system may include an authentication module having a key management component. The library of regulatory body approved game components may include, for example, pay tables, audio components, visual components, symbols, and/or a plurality of game logic modules.

The wager game production system may comprise a digital signatures area. The wager game production system may include digital signatures of each gaming control board ("GCB")-approved game component in a database of GCB-approved game components. The GCB document production module may also include a compliance certificate creation sub-module.

Alternative methods of creating wager games are provided herein. Some such methods involve the following: providing access to a game provider host system, wherein access is provided by a game provider to a game developer; enabling development of a wager game in a workspace in the host system by allowing a game developer to use GCB-approved game components; importing developed wager game code from the workspace to a testing environment; performing game feasibility and market testing on a wager game corresponding to the developed wager game code; determining appropriate gaming jurisdictions for the wager game; and creating a plurality of GCB-specific game packages based on the determined appropriate jurisdictions.

The method may involve rendering the developed wager game code suitable for execution on various gaming devices, e.g., by converting developed wager game code to one or more modified versions. The method may involve creating a formal relationship between a developer and a provider.

Control of GCB-approved components may be maintained by the game provider. Creating a plurality of GCB-specific game packages may involve creating documentation required by a specific GCB. For example, the method may involve creating a differences report providing differences between the GCB-approved components and components in the developed wager game code.

Creating a plurality of GCB-specific game packages may comprise generating GCB-specific game submission packages for a plurality of gaming platforms and a plurality of devices. The method may involve accessing a GCB variant module maintained by the game provider.

The method may further comprise encrypting the digital signature of a GCB-specific game package using a GCB-specific public key and/or electronically transmitting an encrypted game package to a specific GCB. The method may involve authenticating the identity of a specific GCB. The method may encompass enabling a GCB to check signatures of GCB-approved components.

Creating a plurality of GCB-specific game packages based on the determined appropriate jurisdictions may further comprise creating a compliance certificate associated with the wager game. The certificate may correspond to compliance with one or more of the determined appropriate jurisdictions. The method may involve generating a digital signature of a game submission package.

Alternative methods are provided herein. Some methods involve developing new wager game code and submitting the code to a gaming regulatory body. Some such methods include the following: providing access to a game developer to use approved gaming components, thereby enabling the game developer to create wager gaming code; testing the wager game code for technical and operational stability in a testing environment; converting the wager game code to operate on a platform; converting the wager game code to comply with a gaming regulatory jurisdiction; and creating a GCB-specific game package based on the appropriate gaming jurisdictions.

Use of approved gaming components may occur, for example, in a workspace of a host system. The method may be performed, at least in part, according to a Services-Oriented Architecture or a Software-as-a-Service approach. The method may involve converting the wager game code to operate on a gaming device. The method may involve performing game feasibility and market testing on the new wager game code.

The method may involve determining an appropriate gaming jurisdiction for the wager game code. The gaming components may be approved (e.g., pre-approved) by a GCB.

The method may involve creating documentation for a gaming regulator, e.g., creating documentation required by a gaming jurisdiction. For example, the method may further comprise creating a differences report providing differences between approved gaming components and components in the development of wager game code.

BRIEF DESCRIPTION OF THE DRAWINGS

References are made to the accompanying drawings, which form a part of the description and in which are shown, by way of illustration, particular embodiments.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order to not unnecessarily obscure the present invention.

Embodiments of the present invention incorporate aspects of Software as a Service (Saas) and Service-Oriented Architecture (SOA) to provide a game development environment by which individual game developers may interface with a larger manufacturer in the gaming industry market, and in which such developers may employ a variety of software tools and existing libraries of content to convert their ideas for new games of chance into reality. Further embodiments of the invention are also provided by which games developed according to such a model may be demonstrated, tested, converted to an appropriate platform, guided through the necessary regulatory processes, and distributed. The particular technology used for hosting the embodiments described herein need not be specific to the present invention. These and other suitable technologies for hosting the services described below may be used.

Figure 1:
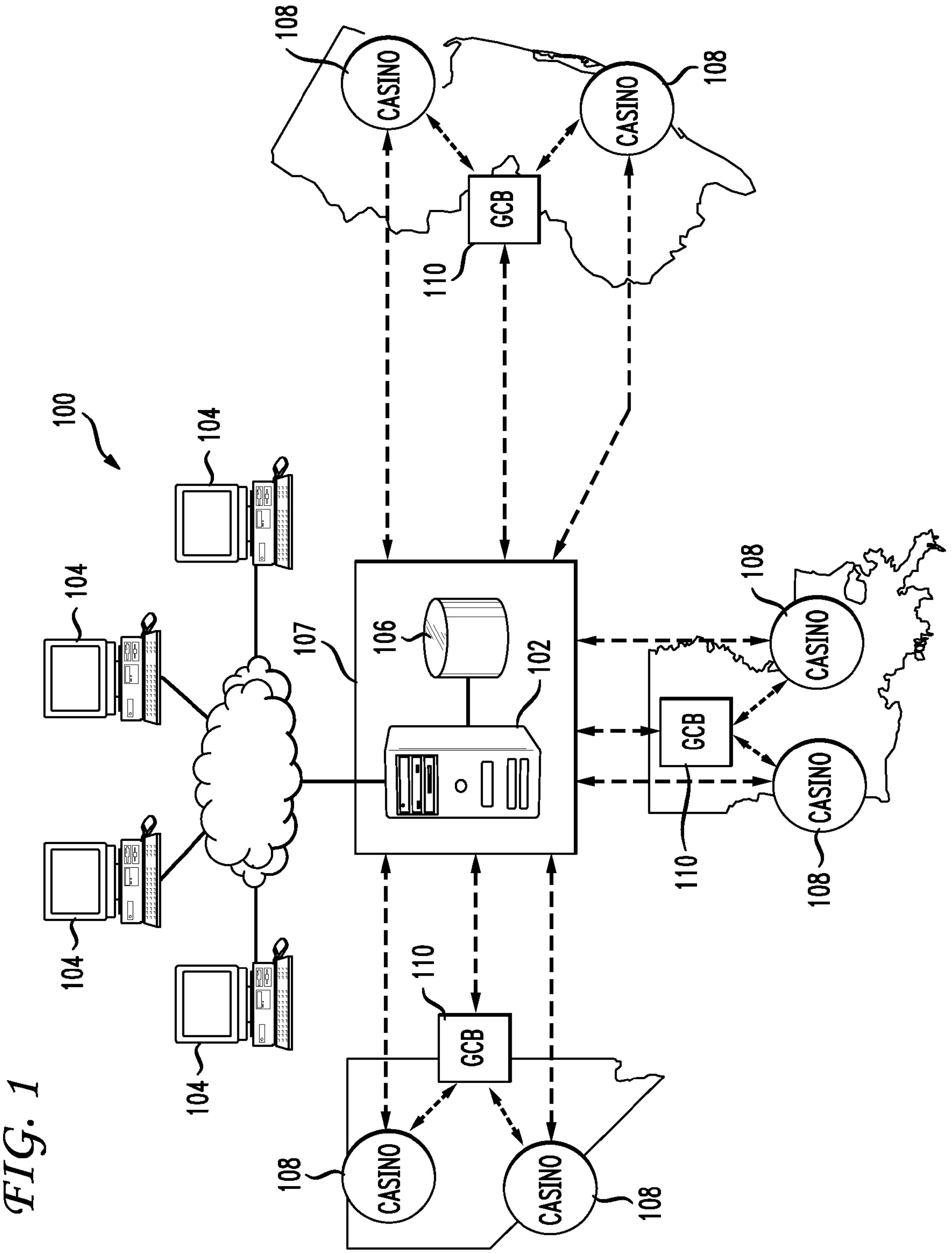
FIG. 1 is a simplified diagram of a network environment in which a particular embodiment of the invention may be practiced.

FIG. 1 shows an exemplary network environment 100 in which various embodiments of the invention may be practiced. Although the subsequent description assumes that this network is a wide area network employing the TCP/IP protocol (e.g., the Internet or the World Wide Web), it will be understood that the network shown is merely exemplary and should not be thought of as limiting the scope of the invention in any way. Rather, the various embodiments of the invention described herein may be implemented in any of a wide variety of network environments and topologies and using any of a wide variety of network devices and network communication and data transmission protocols.

In the embodiment shown, game development server 102 is maintained and operated by a gaming machine provider and game publisher such as, for example, International Game Technology (IGT) of Reno, Nev., and may represent one or more servers in one or more locations. Server 102 may also be implemented using any of a wide variety of commercially available servers. It will be understood that a wide variety of entities may play this role according to alternative embodiments of the invention. Server 102 hosts a game development environment implemented in accordance with the present invention. Network 100 facilitates access by game developer clients 104 to the development environment on server 102. According to various specific embodiments, clients 104 comprise personal computers, workstations, or any other type of personal computing devices.

According to a specific embodiment, clients 104 employ a local client to interact with server 102 via network 100. According to one embodiment, this interaction is made secure using some form of encryption, e.g., the well known RSA technologies. The graphical user interfaces hosted by server 102 provide the game developers at clients 104 access to a game development environment which comprises multiple software tools and objects. According to various embodiments, the development environment may comprise any of a wide variety of proprietary and/or publicly available object-oriented software (e.g., Java) authoring tools which are capable of constructing interactive games. Such tools may include for example, compilers, optimizers, debuggers, sequencers, scripting languages (e.g., to control game flow), animation tools, graphics engines, etc.

According to some embodiments, the software tools include a graphics engine which allows the game developer to customize the visual aspects of the game by, for example, allowing him to create visual representations of a world or universe associated with the game. A graphics engine is low-level software that interacts with the hardware to display a scene. For example, in response to the scripting command "spin reels," the underlying graphics engine would begin the animation sequence by computing the pixels to display, and then request that the graphics card display the animation on the screen. A typical graphics engine might facilitate animation, texture, lighting, rendering, zooming, panning, clipping, physics simulation, collision detection, or any combination thereof.

The game development environment, described in greater detail below, may also comprise one or more libraries of preexisting software objects (e.g., library 106) which may be employed in the construction of such games. Examples of such software objects include, but are not limited to, game templates (e.g., poker, blackjack, spinning reels, keno, etc.), bonus templates, clip art, graphics, audio clips, video clips, pay tables, and any combination thereof. Game templates might include pay tables, graphics symbols (e.g., reels and cards), game layout defaults (e.g., buttons, reels, and credit meters), and fonts.

The developer may also contribute his own objects which may ultimately become part of library 106. Additional game customization tools may also be provided to enable the game developer to develop a unique look and feel for his new games. According to various embodiments, the game development environment user interface may be graphical, scripting based, template based (e.g., fill-in-the-blank variety), or any combination of these.

According to embodiments in which the game development site corresponding to server 102 is hosted by a gaming machine provider 107 such as IGT, the gaming machine provider's experience with the regulatory process, and its manufacturing and distribution infrastructure are represented by the dashed lines indicating the existing relationships with or experience dealing with the corresponding entities, e.g., gaming establishments 108 and gaming control boards 110. That is, the dashed lines between gaming machine provider 107 and gaming establishments 108 may represent, for example, the distribution chain by which games software and gaming machines are provided to the gaming establishments, as well as the ongoing service relationship between the two entities. By contrast, the dashed lines between the gaming machine provider and GCBs 110 may represent the regulatory approval process for new games, as well as the ongoing oversight provided by the GCBs of the distribution of gaming machines in their corresponding jurisdictions. The dashed lines between gaming establishments 108 and GCBs 110 represent the interactions between these entities.

Figure 2:
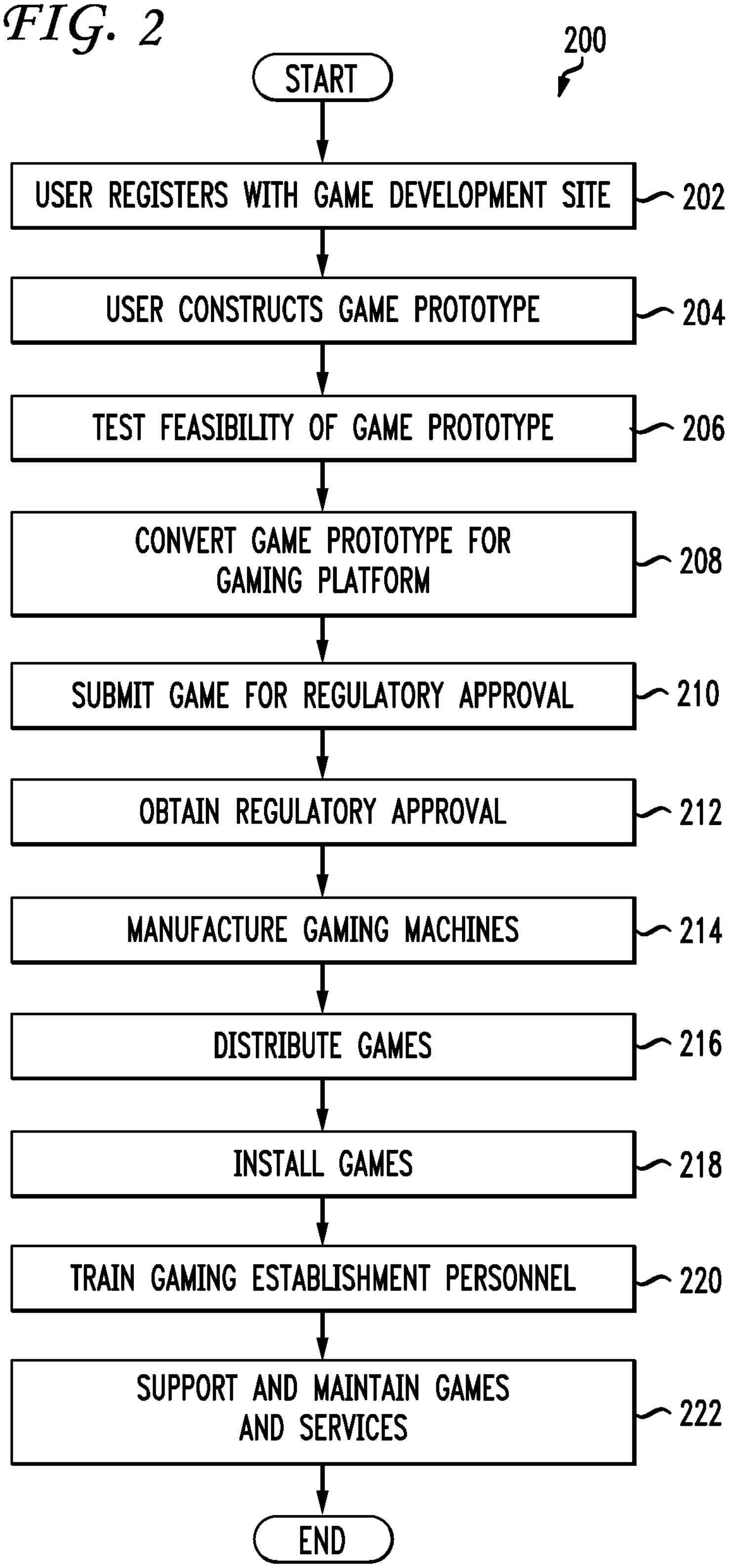
FIG. 2 is a flowchart illustrating a specific embodiment of the present invention.

Referring to flowchart 200 of FIG. 2, a game developer registers with a game development site designed in accordance with the present invention via the Internet 202. As part of this registration process a contractual relationship between the parties may be established which may include, for example, financial terms regarding the development and/or exploitation of any games developed on the site. For example, the game developer might pay for actual usage of the game development or creative environment (e.g., dollars per unit time), or a subscription fee for unlimited use (e.g., a monthly fee). Alternatively or additionally, the game publisher and the game developer might contract for ownership and control of games developed on the site, and/or a percentage of any revenues derived from distribution and/or use of gaming machines based on games developed on the site.

The game developer may then use the tools and services in the game development environment, any of a variety of existing game templates and library objects, and any additional objects contributed by the game developer himself to construct a game prototype which is actually operable to play the intended game (204). As will be understood, the game developer does not necessarily need to avail himself of available game templates or objects to generate the prototype. The prototype may be in a neutral or proprietary format. This format could be subsequently recompiled to a specific target, e.g., hardware specific slot machines.

The game developer (or alternatively the site host) may then test the feasibility of the prototype using game qualification services provided by the site host (206). These services may include, for example, pay table testing (for custom created tables), feasibility testing, regulatory compliance testing, market acceptance testing (e.g., field trials), etc. The site may also automatically generate any necessary documentation of the game development process which may be required for any subsequent regulatory approval process. The ability to document and to make the game development process secure, benefits both the game developers and the game publisher by eliminating much of the uncertainty and risk by which such relationships are traditionally characterized.

According to a specific embodiment and as mentioned above, the game development and production environments may be operated by a game provider/publisher such as IGT. According to such an embodiment, the existing infrastructure of such an entity may be employed to facilitate regulatory approval and distribution of games of chance developed on the game development site.

Referring back to FIG. 2, a game provider/publisher has the capability of taking the game prototype tested in 206 and converting it to a format amenable for use on a gaming machine platform in a gaming establishment, e.g., a casino (208). Alternatively, the format might be for use on an Internet gaming platform or other specific game provider platform, such as AVP from IGT of Reno, Nev. The format may also be tailored for a specific gaming device, such as a hand-held gaming device, a laptop or notebook styled device, or a player terminal at a game table, to name a few examples. As will be understood, the appropriate final format will vary depending on the environment in which the game is intended to be deployed. In any case, the format to which the game is converted will typically have the characteristics required for operation within the gaming industry. That is, for regulatory approval as well as customer satisfaction, games in the gaming industry must be robust and secure. For example, player balances on a given machine must be maintained in the face of power glitches and potential security breaches. Prototypes developed according to the present invention will not typically have such characteristics in that it is not necessary to build such features into the software until the feasibility of the game has been tested.

In addition, because of the complexity of the regulatory approval process and the diversity of gaming jurisdictions, and the cost associated with obtaining such approval, submission of the game to one or more regulatory bodies in such gaming jurisdictions (210) may be more easily facilitated by the gaming machine manufacturer than would be possible by the game developer acting alone due to the manufacturer's license to operate, dedicated infrastructure and experience with the process.

Once regulatory approval in the relevant jurisdictions is obtained (212), the game provider/publisher's infrastructure and relationships with gaming establishments may be leveraged to manufacture the new game (214), distribute the games to gaming establishments (216), install the games (218), train the gaming establishment personnel in the use of the games (220), and provide maintenance and support (as well as a variety of other services) for the hardware and software of the gaming machines (222).

Figure 3:
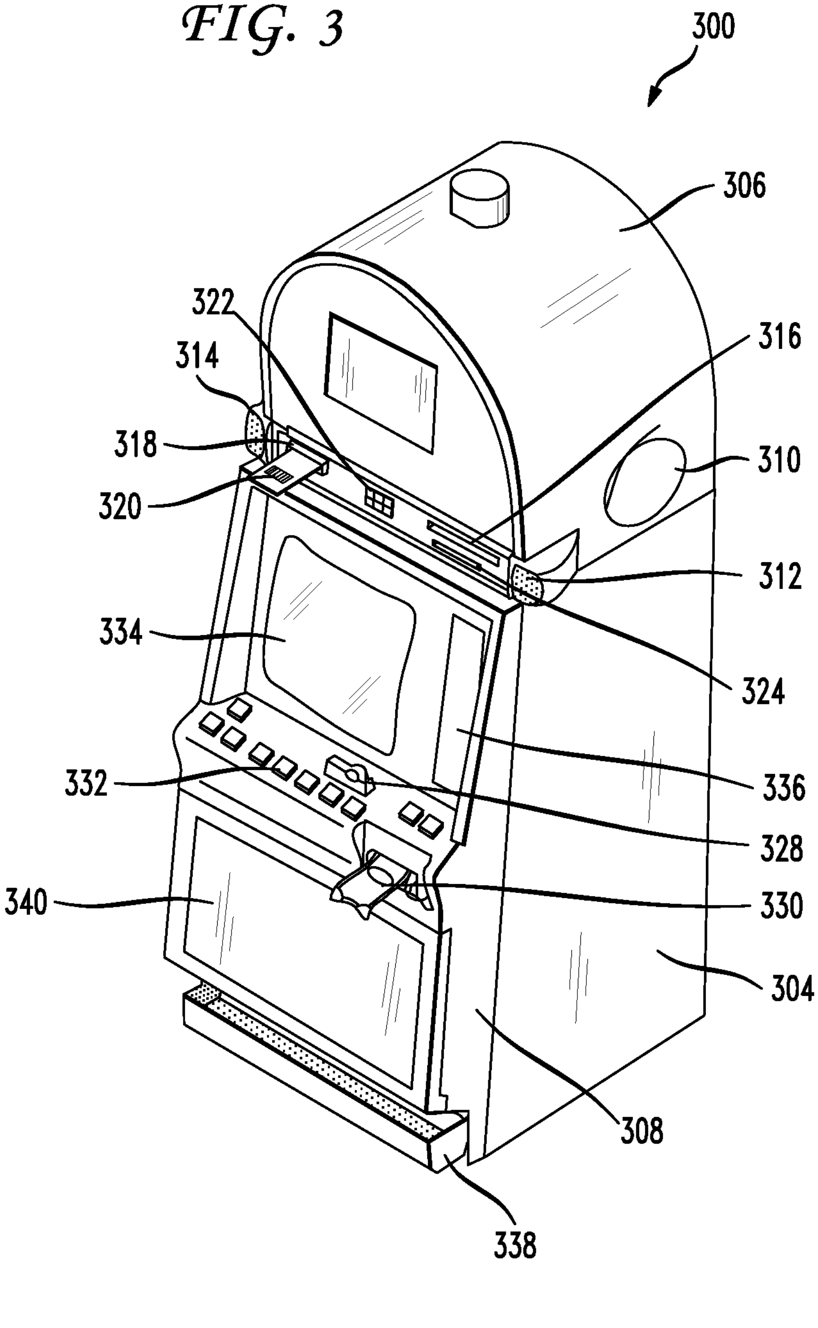
FIG. 3 is a gaming machine which may be used in accordance with a particular embodiment of the invention.

FIG. 3 is a block diagram of an exemplary gaming machine 300 for enabling operation of the games of chance developed according to various embodiments of the present invention. Machine 300 includes a main cabinet 304, which generally surrounds the machine interior (not shown) and is viewable by users. The main cabinet includes a main door 308 on the front of the machine, which opens to provide access to the interior of the machine. Attached to the main door are player-input switches or buttons 332, a coin acceptor 328, and a bill validator 330, a coin tray 338, and a belly glass 340. Viewable through the main door is a video display monitor 334 and an information panel 336. The display monitor 334 will typically be a cathode ray tube, high resolution flat-panel LCD, or other conventional electronically controlled video monitor. The information panel 336 may be a back-lit, silk screened glass panel with lettering to indicate general game information including, for example, the number of coins played. The bill validator 330, player-input switches 332, video display monitor 334, and information panel are devices used to play a game on the game machine 300.

The various device and functionalities of gaming machine 300 devices are controlled by circuitry (not shown) housed inside the main cabinet 304. According to some embodiments, the control circuitry of gaming machine 300 comprises a conventional personal computer, workstation, or similar device which facilitates the functionality of the individual gaming machine 300 as well as provides an interface (not shown) to a gaming network (e.g., gaming network 100 of FIG. 1) using proprietary or conventional protocols such as, for example, Ethernet, TCP/IP, etc. Using such an interface, information relating to game activity on gaming machine 300 may be transmitted over the gaming network for any of a variety of purposes including, for example, effecting control or triggering payment of a progressive jackpot.

The gaming machine 300 includes a top box 306, which sits on top of the main cabinet 304. The top box 306 houses a number of devices, which may be used to add features to a game being played on the gaming machine 300, including speakers 310, 312, 314, a ticket printer 318 which may print bar-coded tickets 320, a key pad 322 for entering player tracking information, a fluorescent display 316 for displaying player tracking information, a card reader 324 for entering a magnetic striped card containing player tracking information. Further, the top box 306 may house different or additional devices than shown in FIG. 3. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 304 of the machine 300.

In addition to facilitating regulatory approval and distribution of new games of chance, the expertise and infrastructure of the gaming machine manufacturer may also be leveraged to facilitate any of a variety of additional gaming services in conjunction with the playing of the new game. This would enable a level of interoperability for the game that might not otherwise have been possible in the unlikely event that the independent game developer himself had actually been successful in obtaining regulatory approval and distribution of his game. For example, in networked gaming environments in which multiple games are linked, progressive jackpot services may be enabled. Player tracking services in which, for example, players are rewarded for their patronage of particular gaming establishments, may also be enabled.

As discussed above, wager game software providers/publishers have established gaming network infrastructure, gaming regulation submission expertise, and extensive related knowledge and know-how with respect to presenting new wager game software to gaming regulatory bodies or gaming control boards (sometimes referred to as "GCBs" hereinafter), and guiding the gaming software through the regulatory process. Methods and systems for facilitating wager game development and for expediting the GCB regulatory process are described in further detail in FIGS. 4 to 15.

Figure 4:
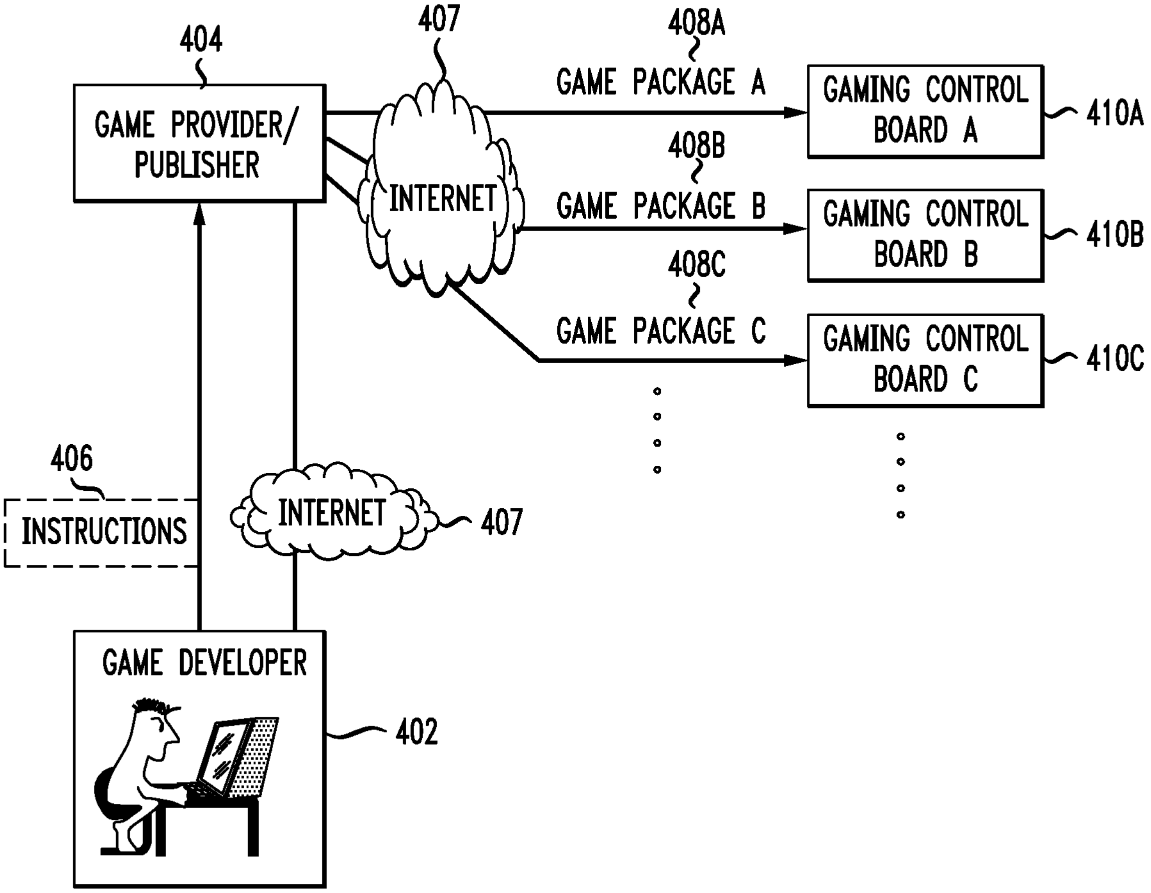
FIG. 4 is an overview block diagram showing the parties involved in the game development and regulation process and the data transmitted between the parties in accordance with one embodiment of the present invention.

FIG. 4 is an overview block diagram showing parties involved in the game development and regulation process generally and the data transmitted between the parties in accordance with one embodiment of the present invention. Game developers 402, for example, individuals working from home or small companies/start-ups, are in communication with a game provider/publisher server 404, typically an experienced entity in the industry such as IGT of Reno, Nev., after having formed a relationship with the developer as described above, for example, by executing a contract stating the financial terms of the relationship and allocation of revenue if the game is successful, among other provisions, such as software ownership.

In one embodiment, game developer 402 provides game development instructions 406 to game provider server 404 via Internet 407 and develops a prototype of a new wager game using systems and software operated and controlled by the game provider/publisher. The communication and transmission of data between developer 402 and publisher server 404 may occur over any suitable and sufficiently secure network. In other embodiments, the network may be a VPN, Intranet, or other type of network. In some embodiments, the data or portions of the data transmitted between game developers and provider/publisher server 404 are encrypted for security. In one embodiment, game developer 402 authenticates and verifies his or her identity with the game provider/publisher before gaining access to server 404 and the software stored therein for game development.

Continuing with FIG. 4, once a game package for a new game has been developed, the game provider/publisher transmits variations of the game package, shown as game package A (408A), game package B (408B), and game package C (408C) to various regulatory bodies, wherein the variations result from regulatory variants, as discussed below. These game packages are comprised of modules based on the prototype created by game developer 402 on the publisher's server 404. The game packages are submitted by the game provider to gaming control boards A (410A), B (410B), and C (410C) for regulatory approval. Language requirements and other preferences for the various GCBs may also be taken into consideration when creating the game packages, also discussed in greater detail below. It should be noted that although FIG. 4 only shows one game developer 402 for illustrative purposes, there may be a multitude of developers (as shown in FIG. 1), numbering in the hundreds or even thousands. One of the goals of the present invention is to make the wager game development and, moreover, the regulatory submission/approval process accessible to any person or entity in the general public interested in developing wager games and willing to enter a contractual relationship with the game provider/publisher.

The number of GCBs or other regulatory bodies may be 30 or so in the U.S., each regulating gaming in a specific jurisdiction, typically a state, as illustrated in FIG. 1. Worldwide there are more than 200 regulatory gaming bodies, each having jurisdiction over a specific geographic area, such as a country, province, state, territory, and so on. In one embodiment, game packages may be sent to any of these worldwide regulatory bodies. As described below, game packages are customized to meet specific "local" rules and regulations of each regulatory body that the developed game is sent to. Thus, although the underlying new wager game code modules are generally the same, certain aspects, such as format, language, documentation and the like may vary depending on which GCB the game package is being sent to, thus the need for various game packages A, B, C, and so on. In one embodiment, transmission of game packages is performed over Internet 407 or any other suitable network. In a preferred embodiment, encryption and other security measures are taken during transmission of the game packages over Internet 407 from game provider/publisher server 404 to GCBs A, B, C, and so on.

Figure 5:
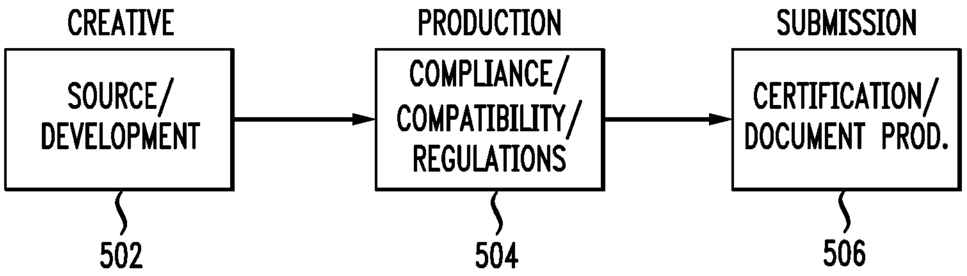
FIG. 5 is an overview block diagram showing of stages of game development and submission by a game provider/publisher suitable for implementing embodiments of the present invention.

FIG. 5 is an overview block diagram of stages of game development and electronic submission by a game provider/publisher suitable for implementing embodiments of the present invention. In one embodiment there are three stages that occur under the control of a game provider/publisher up to the time a game package has been electronically transmitted to a regulatory body. The first stage may be referred to as a "creative" stage 502. At this stage game developers create and experiment with new games, ranging from creating new "skins" for previous games, where, for example, only audio and visuals aspects may be changed, to development of entirely new wager game concepts. Developers have a wide range of creative control and can experiment and "tinker" with gaming concepts, skins, etc. and try out entirely new ideas (one of the benefits of having hundreds of individual entrepreneurs working on new gaming ideas) with the goal of developing new facets of existing games or new games, or something between these two ends of the game development spectrum.

The next stage may be referred to generally as a "production" stage 504 where various game-related services and operations occur. These are described in detail below, but generally include, for example, rigorous compliance services (to standards and regulations), compatibility testing, jurisdiction and platform conversion (e.g., conversion to server-based gaming platforms), and various other services.

In one embodiment, Services-Oriented Architecture (SOA) is used. Although SOA is often used in the Web services context, in the described embodiment, the services may be aggregated in the game production process discussed herein. In this embodiment, and as described herein, game production is achieved through an architectural approach, specifically, an SOA approach. The methodology or approach taken in one embodiment breaks down or segments the previous manual and inefficient process into multiple modular services, such as those described in FIG. 5 above, namely, creative services, production and testing services, conversion services, and electronic submission services. Another approach that may be used to implement the present invention is the Software as a Service (SaaS) paradigm which may be used to execute the various services on the game code created by the developer and received from creative stage 502. For example, the code is received and disseminated to modules or components that perform the various services or operations that need to be performed on the game code, services such as code conversion, authentication, digital signature generation, testing, and so on. These software services are typically hosted by the game publisher such as IGT, but could also be hosted by another independent third party.

After the game code has gone through production stage 504, in one embodiment, the final stage before electronic transmission (submission) of game packages to regulatory bodies is a submission stage 506. At this stage the game code is prepared for submission to the GCBs and regulatory bodies. For example, numerous documents showing that certain testing has been done and that previously approved modules are being used, are packaged with the game code. Other services such as formatting, conversion, ensuring GCB guidelines and procedures are followed, and the like may also be performed. In one embodiment, a certificate of compliance prepared by the game provider/publisher attesting or formally declaring that the game code being submitted adheres to the regulations of the destination regulatory body may also be included. A more detailed discussion of the submission process is described in FIG. 9.

Figure 6:
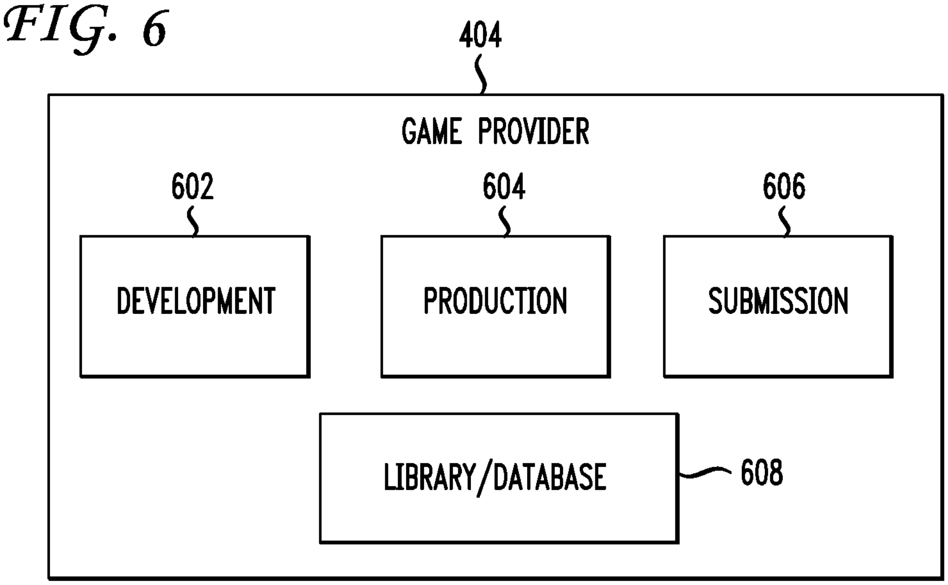
FIG. 6 is an overview block diagram of components in game provider/publisher server 404 in accordance with one embodiment of the present invention.

FIG. 6 is an overview block diagram of components in game provider/publisher server 404 in accordance with one embodiment of the present invention. A development module or environment 602 is used primarily by game developers to create new games using tools, knowledge, expertise, and the like of the game provider/publisher. It is the environment in which creative stage 502 takes place. A production space 604 is used by game provider/publisher to perform rigorous production-oriented services on the game code, as briefly described above. The game code is prepared for submission to regulatory bodies in a game submission environment 606. Each of these components of server 404 contains various sub-modules and components described in detail below. Also included in game provider server 404 is a library or database 608 containing data, modules, tools, and code needed by a game developer to create games and may also be needed by the provider/publisher to perform services and prepare the game code for submission to regulatory bodies.

Figure 7:
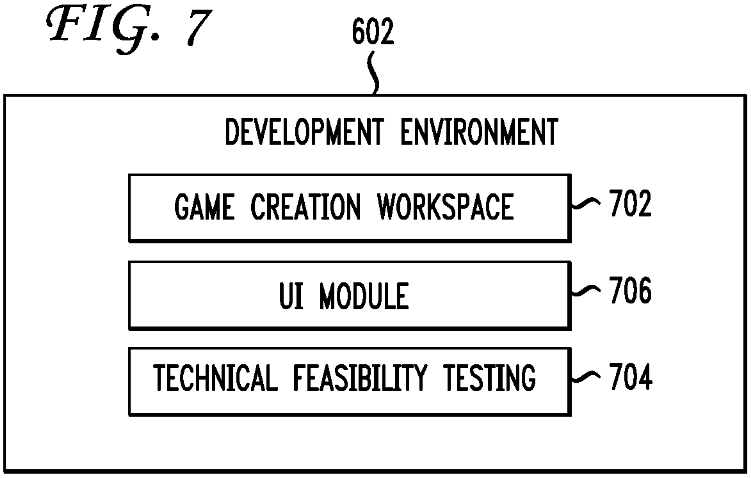
FIG. 7 is a logical block diagram showing further details of development environment 602 according to one embodiment.

FIG. 7 is a logical block diagram showing further details of development environment 602 according to one embodiment. A game creation workspace 702 is an allocated space in memory on game provider/publisher server 404 where the developer can create game code, perform tests, experiment, try new ideas, debug, and the like on new game concepts. A technical feasibility testing module 704 may contain game publisher code for performing various marketing, technical, and software engineering tests on a game module after it has been created by a game developer. For example, the game code may be tested to ensure that there are no obvious or critical software or coding errors that may cause the gaming machine to enter a tilt state, freeze, or cause any other serious malfunction. Rigorous testing methodologies are known in the field of wager game development and may be executed in feasibility testing module 704, which, for example, may run or execute a "first cut" gaming code module 10,000 or more times.

Game developer user interface module 706 enables a game developer to use the tools available from the game provider from the developer's Web browser. User interface component 706 may be implemented in various forms and may have a wide range of controls that allow the individual developer to use tools available and other programming methodologies to create new wager game prototypes.

Figure 8:
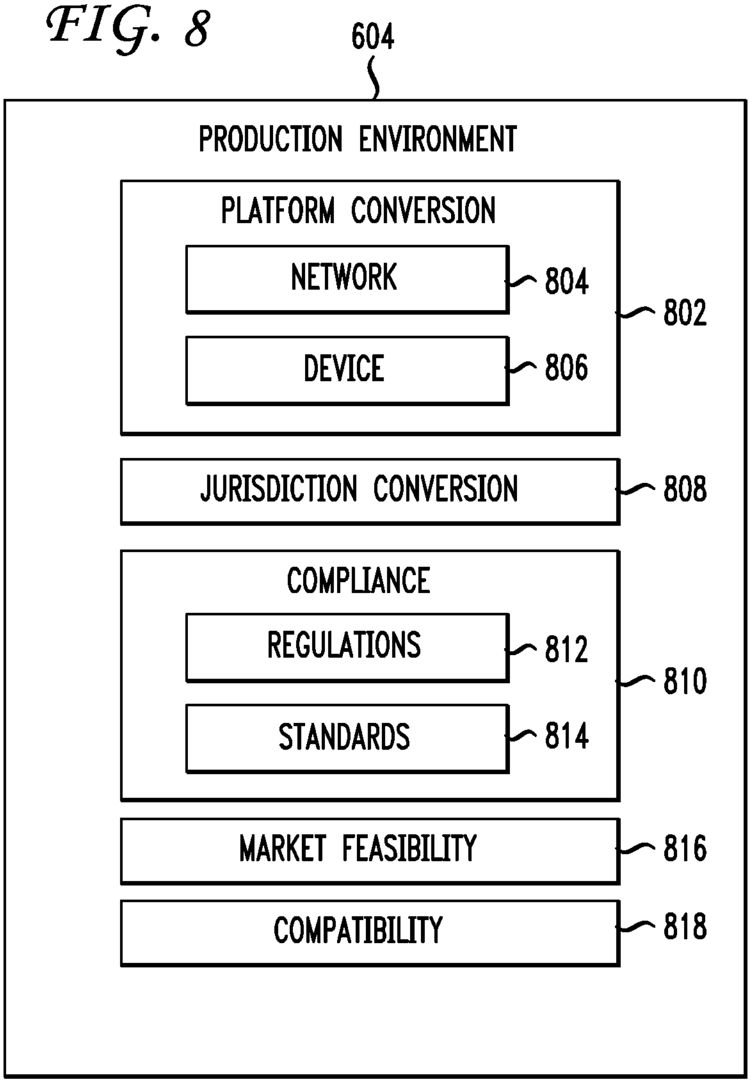
FIG. 8 is a logical block diagram showing greater details of production environment 604.

FIG. 8 is a logical block diagram showing greater details of production environment 604. In one embodiment, a platform conversion module 802 executes services for converting game code (as output from the development stage) to run on various gaming platforms. In one embodiment, these gaming platforms may be server-based gaming network platforms. As noted below, the server-based gaming paradigm is being increasingly used by gaming operators to offer a greater number of games to players and services and to increase efficiency with respect to changing games, services, functions, and the like on a gaming machine. One embodiment of a server-based gaming network is described in detail in FIGS. 16 to 17. There are or will likely be several vendor-specific server-based gaming networks and platforms in the casino marketplace. For example, one server-based gaming system is offered by IGT of Reno, Nev. Others are offered by companies such as WMS, Ballys, and Aristocrat, all of which may be referred to as game providers/publishers. A gaming operator or casino may decide to purchase and install any one (or possibly more, for very large networks) of the server based platforms available in the market. The actual gaming machines and gaming devices operating on the platform may be from various gaming machine manufactures (i.e., they do not all necessarily have to be from the manufacturer of the server-based platform). However, each server-based gaming platform will have its own technical specifications and requirements. Presently, there is not a single, uniform standard for implementing a server-based gaming platform and it is not expected that there will be one.

With the advent of server-based gaming, gaming operators are able, for example, to change games on a machine from a central location and without having to open or physically change anything on the machine. The content that may be downloaded from one or more central servers is not limited to wager game code. A wide variety of content and software for services may be downloaded to the machines, including game themes, casino services, promotional and marketing materials, ads, and the like. The range of server-based gaming downloadable "products" or content will likely grow over time as the versatility and sophistication of server-based gaming platforms grows. The server-based gaming platform, regardless of the provider/manufacturer, is a very dynamic environment compared to the conventional, non-server based gaming networks.

The various server-based gaming platforms will each likely have certain requirements for wager game software in order for the software to be transmitted (or travel) on the platform, i.e., for the game code to go from point A to point B on the network. A gaming operator or casino will likely select one server-based gaming provider. It will want to manage and operate only one server for its network, not three or four from different providers. However, the gaming operator will expect that the wager game software that it purchases from the various game providers/publishers will run on or be compatible with whichever server-based network the gaming operator has selected. For example, if a gaming operator has implemented an IGT server-based gaming platform, it will expect that the wager game software it obtained from Bally's or Aristocrat be compatible with the IGT network (compatibility with an actual gaming machine is discussed below). Presently, games developed by different game providers/publishers are generally incompatible in various respects, such as audio, video, hardware, operating system, protocols, and so on. These incompatibilities may lead to the games being incompatible on a specific server-based gaming network. That is, presently, games developed by game providers/publishers A, B, and C would not be compatible on a server-based platform developed by company D (only games published by company D would be compatible). However, this incompatibility would defeat many of the advantages of server-based gaming, such as the ability to change games on a machine with far greater efficiency. Thus, gaming operators will want a large library of compatible games from which it can select games to transmit to gaming devices on the network and be able to change games as frequently as desired by the gaming operator to maintain players' interest. If the games from various game providers/publishers are not compatible with a selected server-based gaming platform, the library of games will be significantly limited.

In one embodiment of the present invention, game code created by game developers in development environment 602 is converted or modified using platform conversion module 802 and, specifically, network conversion module 804 so that it will execute on different server-based gaming platforms. In one embodiment, this is done by converting the wager game code to different platform or network versions, for example, a version for platform A, another version for platform B, and so on. In another embodiment, there may be one version that is platform agnostic; that is, the game code is converted to a generic version that can run on different platforms. In either embodiment, the end result is that the game code developed is not limited to one platform (i.e., the platform of the game provider/publisher). Nevertheless, in one embodiment, although the game code may be platform agnostic and when compiled can run on various networks, the wager games may still maintain certain publisher-specific characteristics, nuances, and flavors. It is not expected that because the game code should be platform agnostic that the games become homogenous in their appearance, sound, game play, and the like.

In one embodiment, within platform conversion module 802 is a device conversion module 806. This module contains code for converting game code so that it will run on gaming machines by different manufacturers. In other embodiments, this type of conversion may not be needed. For example, a server-based gaming platform or network may implement gaming machines from three different providers, each only running games developed by the gaming machine provider. Thus, a gaming operator may transmit a game from IGT to a gaming machine made by IGT over a server platform developed by Bally's, assuming network conversion module 804 was used to convert the game code. However, using device conversion module 806, a game developed by IGT may be able to run on a Bally's gaming machine. In this embodiment, a new game developed using the present invention would be more versatile and, therefore, propagate faster onto more gaming machines. Naturally, this scenario would be most desirable by the gaming operator who would be able to take even greater advantage of its growing library of games. Related to gaming machine compatibility or the ability of a gaming machine to run games by other publishers are patent applications describing gaming machine virtualization, wherein a gaming machine by company A can emulate a gaming machine by company B and consequently run games by company B on the machine. Such techniques and systems are described, for example, in U.S. patent application Ser. No. 11/205,619.

Related to platform conversion module 802 is compatibility testing module 818 which ensures, for example, that once the game code has been converted to execute on various server-based gaming platforms that the converted code actually operates without errors on the target platform. For example, code in module 818 may ensure that if a game has been converted to operate on a server platform by company A, that the game can be transmitted properly from a central server in that platform or network to a device on the network (i.e., that the game can be communicated across the platform and reach a destination uncorrupted in an executable format). In one embodiment, module 818 may also perform gaming device compatibility testing of game code converted or modified to operate on different types of gaming devices.

Jurisdiction conversion module 808 performs services related to ensuring that the newly developed game complies with jurisdictional requirements. Each regulatory body has jurisdiction over a certain geographic area and may have specific regulations for any wager games that are played in their jurisdiction. These regulations are not to be confused with other gaming-related rules such as those pertaining to the handling and operation of gaming machines or procedures (outside the scope of this invention) and rules pertaining to the contents (e.g., documents, certificates) of a game package and how a game package must be submitted to the regulatory body.

A jurisdiction may have specific rules on game play, payouts, and even on visual and audio aspects of a game. In one embodiment, these modifications and conversions to the new game code are made by module 808. The game provider/publisher may make the decision as to which jurisdictions the game may be submitted for approval based on the publisher's expertise and knowledge of the wager gaming markets. As noted, there are more than 200 jurisdictions worldwide and the game code requirements of each may be different in at least some minor aspects. This is one example out of many where the game publisher's experience makes this type of conversion feasible, whereas this service would be highly cumbersome and impractical, if not impossible, for the individual game developer to perform on her own. Another example includes converting or modifying game modules to meet local language requirements or needs depending on the jurisdiction.

In one embodiment compliance module 810 ensures that the game code converted for specific jurisdictions complies with the regulations and standards for that jurisdiction. Regulation compliance is performed by sub-module 812 and standards compliance is performed by sub-module 814. Thus, the game provider/publisher can use these modules in production environment 604 to test the game code after it has been converted for certain jurisdictions to make sure that the code complies with the regulations and standards imposed by the regulatory bodies for those jurisdictions.

In one embodiment, market feasibility testing may also be performed in production environment 604 by market feasibility module 816. Because the game provider/publisher will be selling the game to gaming operators or casinos, it may want to perform market tests of the game, especially if it is an entirely new wager game concept, but also even if a new "skin" is being put on an existing game, to see in which jurisdictions (i.e., geographic areas) it will want to sell the game and for which jurisdictions it will need to prepare game packages for approval by the respective regulatory bodies. In some cases, market feasibility module 816 prepares the game code for execution on gaming machines in a casino where actual wagering takes place by casino patrons, although on a very small scale (e.g., two or three machines on a gaming floor) since it is intended only for market testing.

Figure 9:
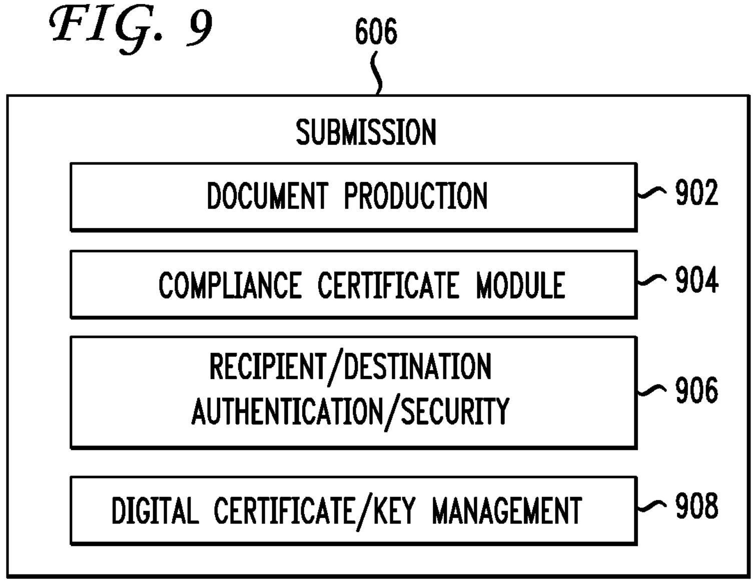
FIG. 9 is a logical block diagram showing in greater detail document preparation and submission environment.

FIG. 9 is a logical block diagram showing in greater detail document preparation and submission environment 606. A document production module 902 contains code for creating reports and documents that may be used to make the regulatory approval process by regulatory agencies more efficient. It may be seen as a means for incorporating by reference previous approval of gaming components into a report for a new game by making a reference or citing to relevant documentation and, thereby, often greatly reducing the volume of documentation needed in a game package submission. Examples of some of the documents that may be required include game performance data, game statistics and game description. In another example, one report may be referred to as a "delta" report which provides only the differences between the game modules being submitted and modules that have already been approved by the regulatory body through previous submissions. A corresponding method is described in FIG. 15 below. In a simple illustration involving changes made only to video and audio aspects of a game, a delta report may show that 95% of the code comprising the game package being submitted, such as the RNG, game logic, pay tables, drivers, schedulers, and so on, have not been modified and are the same (or at least nearly identical to) previously submitted and approved components. The report may show that only certain audio and video modules (i.e., parts of the game's "skin") has changed and show in detail the differences between the old and new modules. There may be a document with notes by the game provider/publisher about the deltas where the publisher explains, for example, that the changes are for adapting a game to a different environment or culture. Other documents may show that pay tables have not changed or that they payout a certain percentage of the time and the like. The goal of document production is to make a detailed showing to the regulatory agency of the changes that have been made for previously approved components or provides details on entirely new modules that are being introduced for the first time. In this manner, the game provider/publisher is attempting to reduce the time and effort needed by the agency to process the submission. Of course, it is entirely up to the discretion of the agency or GCB as to how to use the documents provided. Some of the documents may be required to be in the game package submission based on agency rules and others may be offered voluntarily by the game provider/publisher. As noted earlier, regulatory agencies are becoming increasingly burdened with the growing number of new game submissions and would likely welcome any efforts by known and credentialed game submitters (i.e., providers/publishers) to ease this burden without sacrificing or compromising the actual approval process that must occur as required by state or federal laws.

In one embodiment, a compliance certificate module 904 creates a certificate attesting that the game submitter has complied with all the regulations and guidelines/procedures of the regulatory body to which the game package is being submitted. In one embodiment, it contains an oath or declaration by the game submitter that certain components are the same and that the only differences are those listed in the accompanying documents (e.g., the "deltas" report). This certificate is prepared after the game provider/publisher has completed all testing, created all documents and reports, and has assured to itself that it has complied with all the regulations of the relevant agency. Some regulatory agencies may not require such a certificate and some may, but in one embodiment the certificate is prepared regardless and transmitted with the game package as described below.

Before a game package is sent to a regulatory agency, a game provider/publisher must ensure that it is sending the package to an authorized recipient. In one embodiment a relationship is created or is in place between the game provider/publisher, such as IGT, and the regulatory agency or GCB. This ensures that IGT, for example, submits the game package to an authenticated and verified entity. That is, it is important that the game package, containing sensitive and highly proprietary code, is transmitted only to the intended destination and that, upon arrival, the package only be opened and viewed by an authorized recipient at the regulatory entity. Only authorized individuals at the GCB, for example, should be able to open the game package and view the contents.

In one embodiment, using authentication and security component 906, highly sensitive and valuable wager game content may be transmitted over a network without tampering, theft, manipulation or other foul play. Receiver authentication component 906 contains software for ensuring that the game provider/publisher has made contact with the correct and intended GCB or regulatory entity. For example, before transmitting the game package, the game provider/publisher may request the digital certificate of the entity, which the publisher believes is, for example, the UK gaming regulatory agency. In one embodiment, digital certificates of each regulatory agency with which the game provider/publisher interacts with or may interact with are maintained in or by authentication component 906. This component may operate in conjunction with a digital certificate/key management component 908. Once the regulatory entity transmits back a digital certificate and the certificate matches the UK agency certificate stored by the provider/publisher, the identity of the agency has been authenticated and the provider/publisher can safely transmit the game package to the entity. Before it performs the transmission, the publisher may encrypt the game package using a symmetric key or a public key supplied by the regulatory agency.

More broadly, any information transmitted from the game provider/publisher over a public network to a remote server, such as a GCB server, may be encrypted. In one embodiment, information from a game provider/publisher to a regulatory agency may be symmetrically encrypted using a symmetric encryption key in which the symmetric encryption key is asymmetrically encrypted using a private key. A public key may be obtained by the publisher from the agency or a remote public key server utilized by the agency or GCB. The encryption algorithm may reside in processor logic stored on gaming server 404 or other component in the gaming provider's network. When the regulatory agency server receives a game package (described below) containing the encrypted data, the symmetric encryption key is decrypted with a private key residing on the agency server and the symmetrically encrypted information sent from the game provider is decrypted using the symmetric encryption key. In addition, a different symmetric encryption key may be used for each transaction where the key is randomly generated. In one embodiment, symmetric encryption and decryption is applied to most of the game packages because symmetric encryption algorithms tend to be 100-10,000 times faster than asymmetric encryption algorithms.

Information needed to apply the encryption algorithm, such as private keys and public keys, may be stored in memory (not shown) on a suitable game provider/publisher server, wherein the memory may be a flash memory, an EPROM, a non-volatile memory, a ROM, a RAM, a CD, a DVD, a tape drive, a hard drive or other memory storage device. Typically, the public keys are stored on a writeable media, such as a hard drive, while the private keys are stored on a read-only memory such as an EPROM or a CD-ROM. The same or a different memory residing on a server or other gaming provider/publisher network component may also include information used to authenticate communications between the publisher and a remote agency server. For instance, a serial number or some other identification numbers may be used by a firewall (not shown) or a database server (not shown) to authenticate the sender of a message.

Encrypted communications from a game provider/publisher via server 404 or other network component to a remote regulatory body server may be implemented using a TCP/IP communication protocol. Thus, the encrypted information from the provider/publisher may be encapsulated in multiple information packets and sent to the IP address and/or a unique ID (UID) of a regulatory body or GCB. Server 404 may store a number of IP addresses and/or unique IDs (UIDs) of remote servers or other devices where the hosted game development system may send information. Prior to sending a game package, the game provider/publisher may look up the IP address and/or the UID of the remote regulatory server or destination device.

In one embodiment, for each game package, game provider/publisher may generate one or more signatures and may append them to the package. The signature may allow the GCB or regulatory agency to unambiguously identify the sender of the packet, as well as determining if the correct amount of data was received (e.g., to ensure that the game package is not missing any components). For instance, a signature may include a checksum of the data that was sent. Further, the game package or information packet may contain routing information allowing subsequent communication with server 404, such as an IP address and/or a UID of the server or other game provider/publisher network component. General details of these types of processes, such as TCP/IP implementation and data authentication, are described in the text "Mobile IP Unplugged" by J. Solomon, Prentice Hall and the text "Computer Networks", A. S. Tanenbaum, Prentice Hall. Both of these references are incorporated herein by reference in their entireties and for all purposes.

Figure 10:
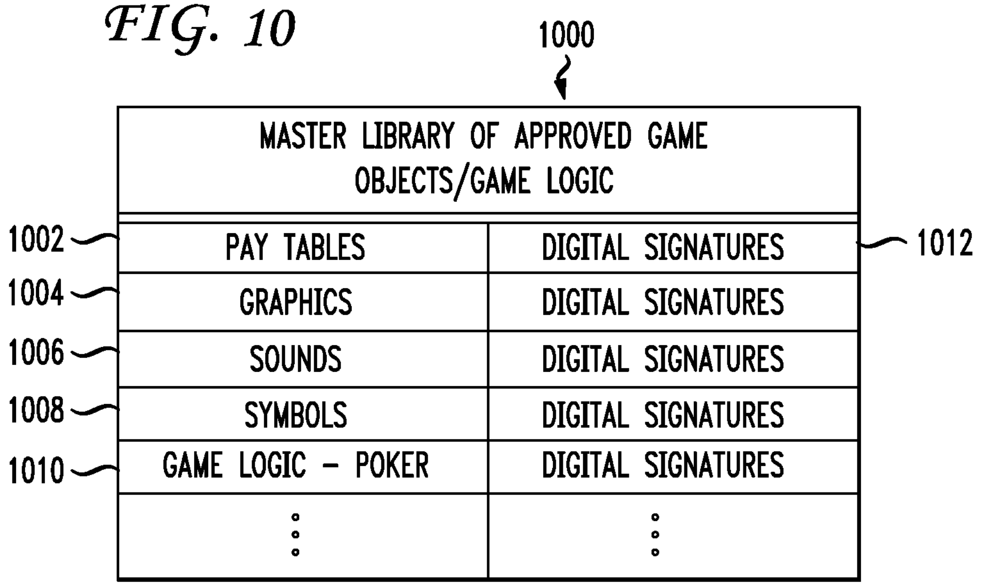
FIG. 10 is a logical block diagram showing a master library of game objects and game logic previously approved by at least one regulatory body in accordance with one embodiment of the present invention.

FIG. 10 is a logical block diagram showing a master library of game objects and game logic previously approved by at least one regulatory body in accordance with one embodiment of the present invention. As described above, the source code and other computer instructions comprising a wager game, referred to as a "game module," is comprised of numerous components or pieces of software, each piece or component responsible for implementing a specific aspect or function of the wager game. Some of these components are common to many different games and may not be game-specific or may require minimal adjustments to work with various types of gaming machines and/or server-based gaming platforms. Such components may have been used in previously approved games. Such components may include pay tables, graphics, sounds, symbols, game logic, operating systems, schedulers, device drivers, and the like.

In one embodiment, a game provider/publisher maintains a master library 1000 of approved gaming components stored in library/database 608 described first in FIG. 6. That is, in one embodiment, master library 1000 has all or most gaming components which have been previously approved in at least one gaming jurisdiction. For example, in one embodiment, section 1002 of master library 1000 contains pay tables and stores approved pay tables for each gaming jurisdiction in the U.S. or worldwide. That is, if a pay table in possession of game provider/publisher has been approved in at least one regulatory body, that table is stored in section 1002. To further illustrate, table section 1004 may contain one or more approved graphics modules for Nevada, California, Macau, and so on. If the game provider does not have an approved pay table or graphics module for a specific jurisdiction (either in the U.S. or worldwide), no pay table or gaming machine component can be "re-used" and one may have to be either borrowed from another jurisdiction (with appropriate adjustments made) or created, and added to the relevant section (e.g., 1002, 1004, etc.) after it has been approved. Similar examples can be provided for sections in memory for sounds 1006, symbols 1008, game logic_Poker 1010 (or game logic_BlackJack, game logic_Reels, etc.), and so on.

In addition, master library 1000 also stores or has associated with each component, a digital signature for each approved component stored in area 1012. The digital signature may be a hash value of the code comprising the component, may be derived from other algorithms used for digital signatures, or may be derived from a game provider proprietary method for enhanced security. In one embodiment, for example, if the same operating system module or component is approved in two or more different gaming jurisdictions, the component has one signature. The data in master library 1000 may be arranged in many different configurations using various database and data storage methodologies, such as relational, hierarchical, multidimensional, VSAM, flat file, and so on. Similarly, the data may be accessed using different techniques. The arrangement of the data shown in FIG. 10 is only one example. For instance, components may be arranged at a high level according to a gaming regulation body or jurisdiction, such that all approved components for Macau are in one section of memory, all components for Nevada in another section, all components for the UK in another, and so on. Within each jurisdictional or geographic section, approved components may be arranged according to type of component, such that all pay tables are stored together, all graphics, symbols, etc. are stored together, as shown in FIG. 10. Other configurations and storage arrangements may also be used without altering or interfering with one of the primary functions of master library 1000, namely, of maintaining a central repository of approved gaming components which can be re-used, and shared. In one embodiment, they are verified using digital signatures stored in section 1012, which contains signatures for each approved gaming component. In another embodiment, the components may be stored or distributed across various storage devices at a game provider's network rather than at a single server.

Figure 11:
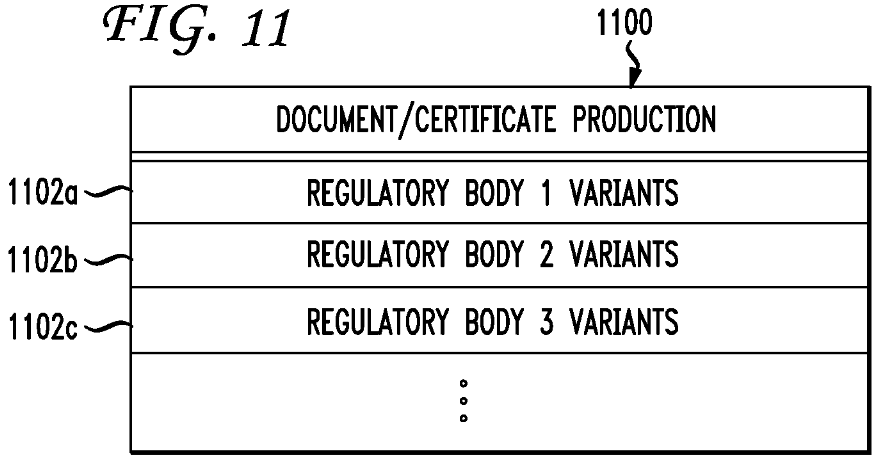
FIG. 11 is a logical block diagram showing a document/certificate production module 1100 that executes in submission environment 606 of FIG. 6 in accordance with one embodiment of the present invention.

FIG. 11 is a logical block diagram showing a document/certificate production module 1100 that executes in submission environment 606 of FIG. 6 in accordance with one embodiment of the present invention. In other embodiments, it may be a distinct or separate module, for example, executing between production and submission environments of FIG. 6. As described above, each jurisdiction or territory that allows gaming typically has a regulatory body which is responsible for enforcing and overseeing the gaming rules and regulations relating to wager gaming in their jurisdiction. These regulations may vary widely from jurisdiction to jurisdiction. A pay table that is acceptable in one jurisdiction may not be acceptable in another. Certain graphics and audio allowed in one country may be barred in another. Furthermore, reporting and documentation requirements, a critical element in getting approval for a game, may vary. One aspect of the game provider/publisher facilitating game prototype development by third-party game developers and managing deployment of those games is derived from the publisher's experience and knowledge of the gaming regulatory submission process of many, if not all, of the hundreds of jurisdictions. Furthermore, many of the jurisdictions have nuances and very specific requirements in their procedures which can make the submission process complex, daunting, and virtually inaccessible to the inexperienced game developer.

Each gaming jurisdiction regulatory body may have an array of specific rules and variants that must be met in all wager game software submissions to that jurisdiction. To take one example, rules vary in the area of gaming harm minimization (to reduce compulsive wagering), wherein such rules include incorporating a "total bet" limit in some jurisdictions versus a "single bet" limit in others. In another example, a game that is compiled for Ladbroke, UK for wager gaming over the Internet using a PC, may have as a requirement that the game software verify that the player is not the United States. In this case, a software module may be included in the game software that checks the IP address of the PC using the online game software and performs traces of data routes to ensure that the PC terminal is not in the US. Another example of a variant is the pay tables that each jurisdiction allows (i.e., the minimum payout percentage required by GCB). There are numerous other examples involving sounds, symbols, video, etc. These variants and rules are contained in components regulatory body 1 variants 1102*a*, regulatory body 2 variants 1102*b*, regulatory body 3 variants 1102*c*, and so on. In one embodiment, each of these components contains data on the rules for a regulatory body to which a game provider/publisher may submit game packages. It may also include regulatory bodies with which the game provider may interact with in the future. The format in which these rules and variants are stored may be the same for each GCB or may vary, for example, have a format instructed or preferred by the GCB.

In one embodiment, game module creation component creates or bundles the actual software game package containing code for one wager game that is transmitted electronically to the regulatory agencies. A game module creations component may format the game software in a format specified by a GCB. These formats can vary widely and may have different security provisions. For example, the manner in which the game software is packaged and the security used for the regulatory body in Macau may be very different from the format required for the Mississippi state GCB. A game module (or package) creation component for a jurisdiction may ensure that the game package is correctly formatted for a specific regulatory body so that the submission is not rejected upon arrival. It may also ensure that all the required documentation for that jurisdiction is included. For example, it may ensure that a certificate of compliance document as described above is included in the game package.

Figure 12:
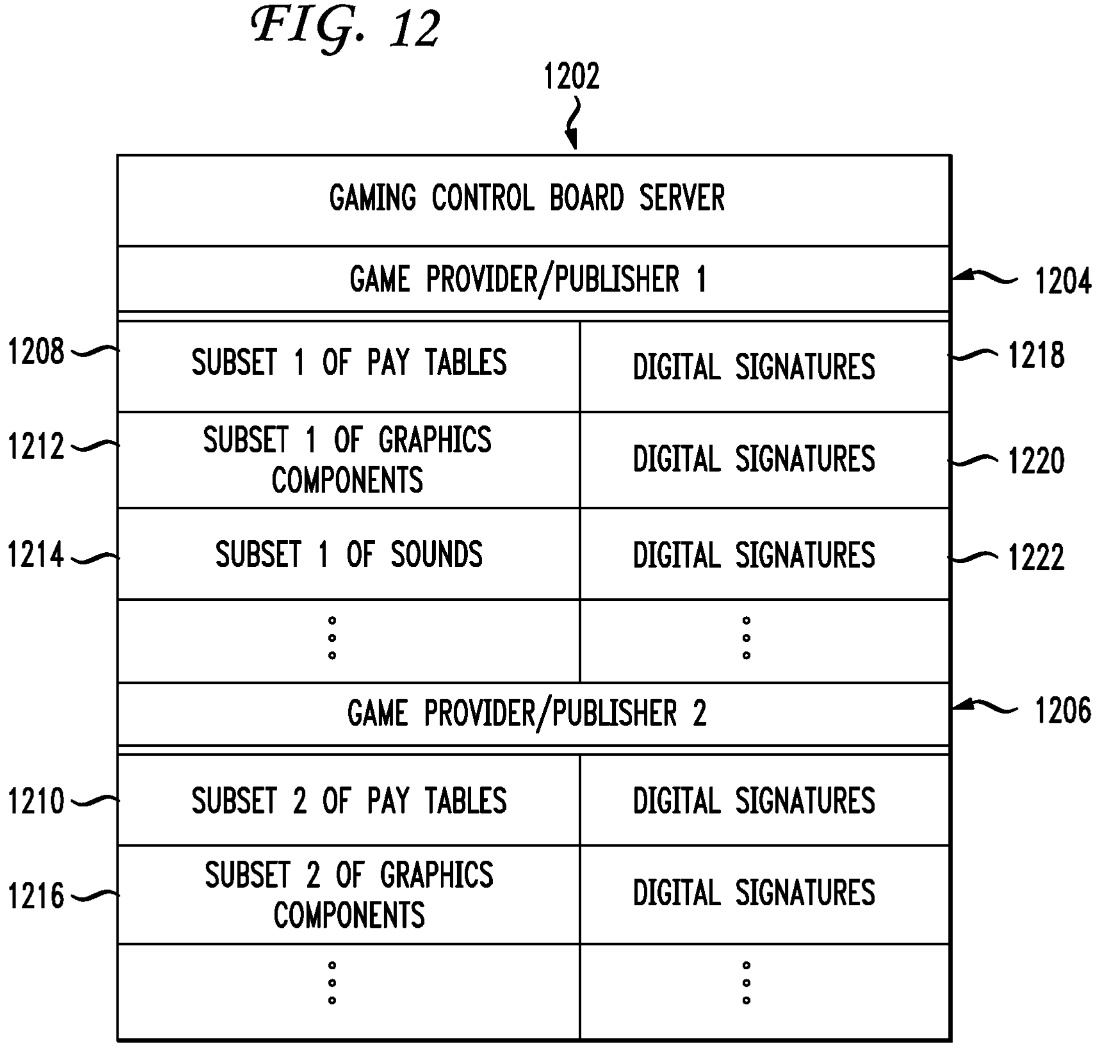
FIG. 12 is a logical block diagram of a server maintained by a regulatory body wherein the server stores components from multiple game providers/publishers in accordance with one embodiment of the present invention.

FIG. 12 is a logical block diagram of a server maintained by a regulatory body wherein the server stores components from multiple game providers/publishers in accordance with one embodiment of the present invention. A server 1402 having a game provider component library has memory areas 1204, 1206, and so on, for game provider/publisher 1, game provider/publisher 2, etc. Once a regulatory body receives a new game package for evaluation and decrypts the package to examine the contents and modules, there are certain modules that may have been previously approved and which need not be re-examined by the regulatory body. In one embodiment, these previously approved components are shown as subsets of the various components. The term "subset" is used to convey that the components (e.g., pay tables, audio) stored by the regulatory body for a game provider/publisher is smaller than (or may be equal to) the total number for that component (e.g., all the pay tables created by the publisher). For example, a game provider/publisher may have 15 pay tables where each one was previously approved by at least one regulatory body. Thus, only a subset of those 15 pay tables may be pre-approved by a particular GCB. In another embodiment, an entire list of approved pay tables for that GCB is provided and the ones being submitted by the game provider/publisher are marked or indicated.

In one embodiment memory area 1208 contains subset 1 of pay tables for game provider/publisher 1, memory area 1210 contains subset 2 of pay tables for game provider/publisher 2, and similar memory areas for publishers 3, 4, and so on. Similarly, a subset of graphics, sounds, operating system modules, schedulers, and the like may be maintained and stored by the GCB in subsets for each game provider/publisher as shown, for example in FIG. 12, in storage areas 1212, 1214, and 1216. A GCB may receive new game packages for approval from any number of game providers/publishers. In one embodiment, a GCB may maintain only subsets of pre-approved game components from certain game providers/publishers who have above a certain threshold number of submissions (e.g., high volume submitters). In other embodiments, subsets are created for a publisher after the entity's first new game submission. In another embodiment, not all publishers may have the same number of categories or subsets. A game publisher may only have a subset of pay tables and graphics components, whereas another publisher may have subsets for sounds, operating systems, and other components. It should also be noted that a subset may only contain one component.

When a previously approved component is examined in a decrypted game package by a GCB, in one embodiment, only the digital signature of the submitted component needs to be compared to the digital signature of the previously approved component, which is securely stored by the GCB. Digital signatures of previously approved components stored by the GCB are contained in memory areas 1218, 1220, 1222, and so on. Each previously approved component is assigned a digital signature by the GCB which is used to verify that the submitted component is the same as the previously approved component. In one embodiment, a GCB may arrange components based on component type, such as pay tables, operating systems, graphics, symbols, logic, etc. and according to game provider/publisher. For example, all the approved game logic component previously provided by publisher 1 are stored in one area of memory along with the corresponding signatures. The set of schedulers stored by the GCB is a subset of all the schedulers stored by game provider/publisher in its master directory. The GCB directory may contain subsets of approved components from a number of different publishers as shown in FIG. 12.

Figure 13:
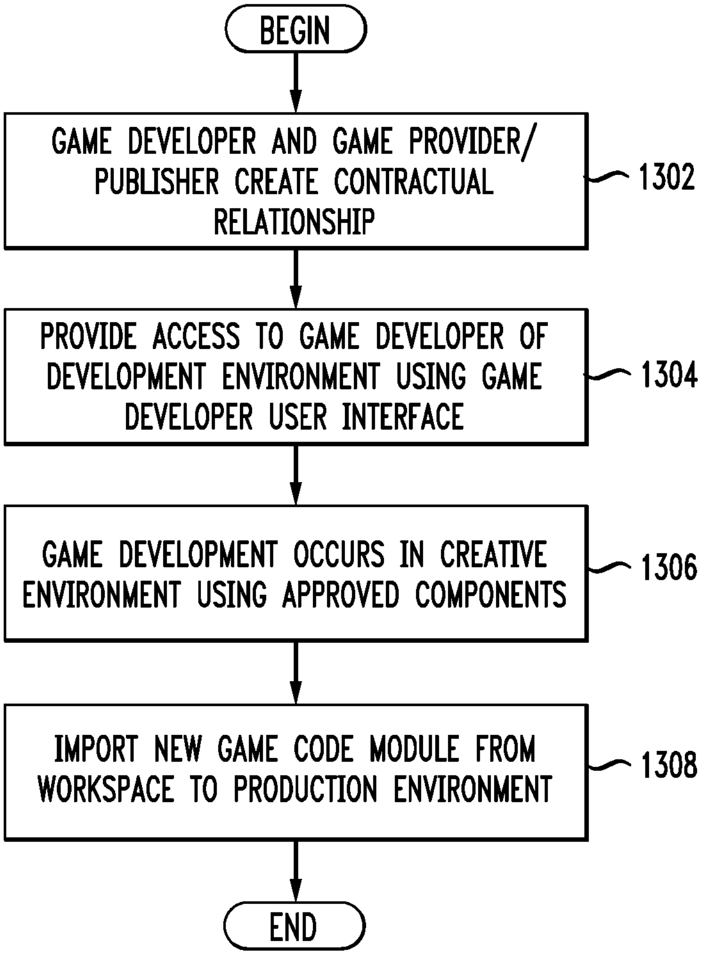
FIG. 13 is a flow diagram showing initial steps taken in creating a game module by a game developer in accordance with one embodiment of the present invention.

FIG. 13 is a flow diagram showing initial steps taken in creating a game module by a game developer in accordance with one embodiment of the present invention. The order of the steps provided in the flow diagram of FIG. 2 is not intended to imply a strict order of the process. Some of the steps may be done in a different order than that shown and some of the steps may not be needed in other embodiments or more steps may be needed that are not shown here. At step 1302 a third-party game developer and a game provider/publisher create a contractual relationship as described above. This can be done by an independent game developer (for example, an individual), initiating contact with a game provider/publisher either by going to the publisher's Web site or by calling the publisher. Once the developer is registered with the publisher and has formed a contractual relationship, the developer has access to the publisher's development environment 602 at step 1304. In the described embodiment, this environment may be implemented as creative environment 502 accessible at the game publisher's Web site via a user interface, such as UI component 706. At step 1306 game development takes place using UI 706 and the tools described above.

At this stage, the developer may desire to access wager game components already created and, in some cases, pre-approved by GCBs. These components may be stored in game component library 608, as described above. For example, a game developer may use game logic software, a random number generator, sounds, graphics, and so on from the game provider/publisher allowing the developer to focus his or her time and effort on creating a new wager game with original and innovative graphics, themes, sounds, game play logic, and so on. In other words, the developer can focus on innovation and creativity instead of "re-inventing the wheel" by coding required and often used gaming components.

Some of the original ideas, concepts, and contributions made by a developer may require that adjustments be made to certain pre-approved library components. This can be done when permitted by gaming regulations of a specific regulatory body. However, in many cases, there will be certain types of components that are not allowed to be modified by developers or even offered to developers for experimentation, such as pay tables, random number generators, and other components known in the art. Essentially, such components are treated as "black boxes" which may be used by the game developer to implement a game, but may not be examined, modified, or retained by the developer (these provisions/rules may be laid out, for example, in the contractual relationship between the parties). At step 1308 the game provider/publisher imports or moves a completed new game module from development environment 602 production environment 604. The game provider/publisher assumes control of the game module by moving the game module out of the developer's creative "workspace" or environment 502.

Figure 14:
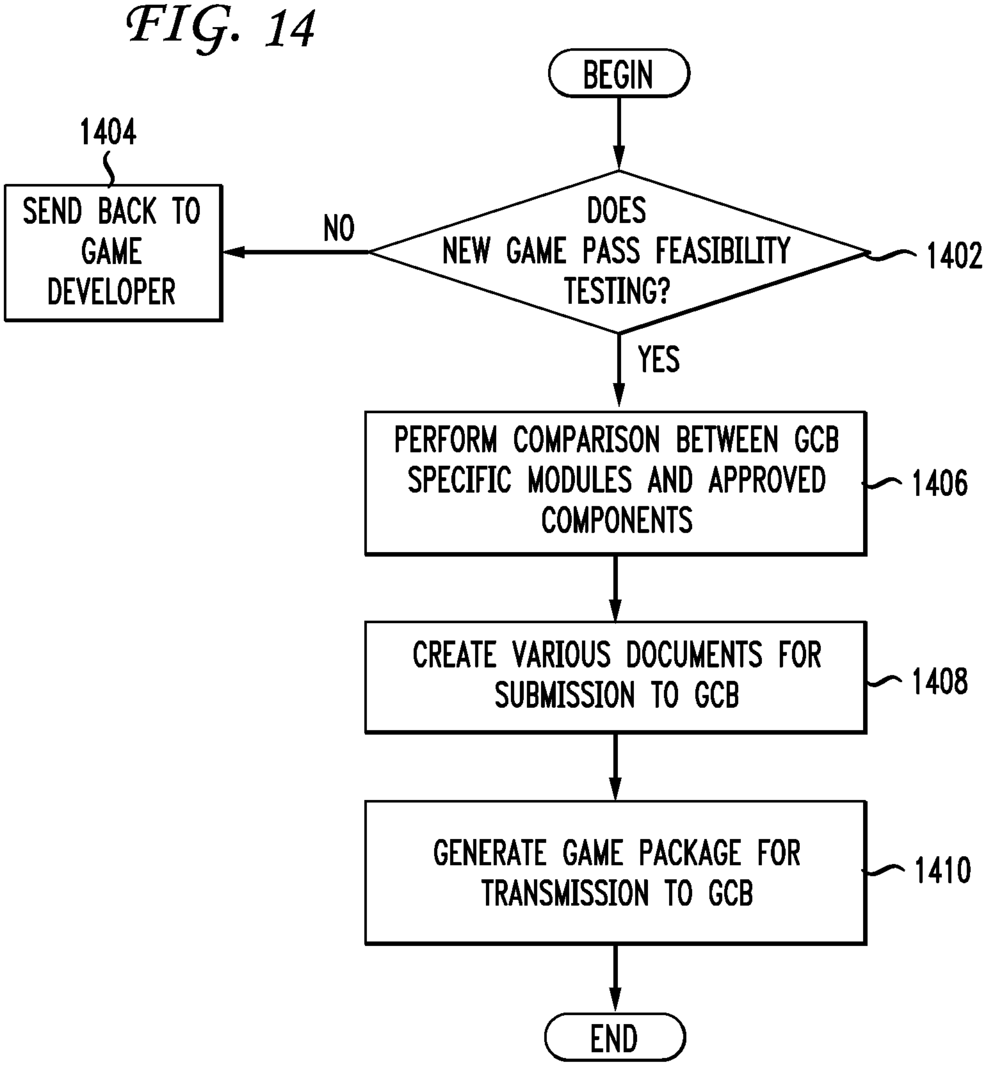
FIG. 14 is a flow diagram showing some of the steps in one example of a process of preparing a game package for submission to one or more regulatory bodies in accordance with one embodiment of the present invention.

FIG. 14 is a flow diagram showing one example of a process involving developing new wager game code and of preparing a game package for submission to one or more regulatory bodies in accordance with one embodiment of the present invention. The order of the steps provided in the flow diagram of FIG. 14 is not intended to imply a strict order of the process. Some of the steps may be done in a different order than that shown and some of the steps may not be needed in other embodiments or more steps may be needed that are not shown here. At step 1402 the game provider/publisher performs various types of testing on the game code. For example, one type of testing is technical feasibility testing. In one embodiment, this type of testing may be performed in the development or creative environment, on the new game code module created by the developer to test whether the wager game is technically stable and executes without errors or "crashing." This type of testing may be efficiently performed given the expertise and experience of the game provider/publisher. In another example, game provider/publisher may perform tests to determine whether the new game is suitable for play on gaming devices other than a "standard" gaming machine. A game developer may typically develop a new game with the intention that it will be played mostly on a gaming machine, such as the one described above in FIG. 3. However, the game may also be suitable for play on other types of gaming devices, such as hand-held devices (e.g., PDAs), iTVs, cell phones, mobile gaming devices, PCs, gaming tablets, gaming tables, and so on. Certain adjustments may be necessary to make the game code suitable for execution on the specific gaming device.

Another type of testing is market feasibility testing which may be performed in the production environment. For example, in some cases, a new game may be too similar to an existing game and, thus, not commercially feasible. In another example, a new game may have graphics and audio that are too violent for certain jurisdictions (which essentially correspond to a geographic area having a specific cultural environment) but acceptable in others. In other examples, a new game may have a theme that is simply not relevant or known in many jurisdictions and thus not commercially feasible in those areas but feasible in others where the cultural environment is quite different. In another example, the game provider may look at the history of similar games in a particular jurisdiction and make a determination based on statistics as to whether the new game will succeed or not. Of course, there is a wide range of factors and elements that a game provider may take into consideration when performing feasibility and marketing analyses. If a new game does not pass any one of the various testing, the developer is notified and it is sent back for modification or redesign at step 1404.

At step 1406, in one embodiment, the game provider/publisher compares modules and code to generate documentation showing differences between the game code components being submitted in the game package and previously approved gaming components stored in master library 608. In one embodiment, this may be done on a component-by-component basis where a conventional text comparison routine may be used to generate a "differences" report. Other methodologies and software routines may be used. This comparison may be performed in the production environment or submission environment.

At step 1408 the game provider/publisher creates one or more GCB-specific game modules as well as the required and voluntarily submitted documents for each jurisdiction (which jurisdiction may be determined for example by seeing where the new game passed feasibility and market testing). Examples of some of the documents that may be required include game data on how the game performed, game statistical data, and game description. Game performance reports may include data such as, "This game was played one million times and these are the results . . . " Game description documents may include a narrative description of the game (i.e., the theme of this game is based on the motion picture "Alien" and is about . . . ), a description of the pay table, winning symbols, etc. As described above, a certificate of compliance may also be generated which certifies or declares the authenticity of the new wager game code modules and that thorough testing that the code confirms to rules and regulations of the GCB has been performed and that the code passed the tests.

As noted above, the game provider/publisher may also create a report based on the output of the comparison function as discussed in step 1406 showing the differences in components. For example, the report may state that there are differences at specific locations and provide meta-data related to the differences. The game provider may want to provide documentation or "evidence," such as a computer-generated report, to a GCB that the game component modules in the new game being submitted are, in fact, the same as the corresponding components stored and previously approved by the GCB or have only minor differences. For example, the new game package being submitted may have game play logic that is similar but not identical to game logic that was previously submitted by the provider to the GCB. A comparison report may also explicitly point out all new components or elements that are in the game module the report may also indicate that there is new content and for the convenience of the GCB. After the GCB has determined to its own satisfaction that the new game code is, in fact, using certain approved components (as stated by the game submitter), the GCB can focus its attention on the new modules (e.g., graphics, sounds, symbols, etc.). By focusing its examination on new content, the GCB can significantly reduce the time in which new game packages are examined without comprising wager gaming enforcement and regulatory oversight duties for its jurisdiction.

At step 1410 the game provider/publisher bundles or packages all the items or deliverable (many of which are created at separate times) such as the differences report, the actual game code, test execution results, game description, compliance certificates, and any other mandatory or voluntary documentation to create a final game package that can be electronically submitted to one or more GCBs. It may also encrypt the game package using a digital certificate of the GCB receiving the package.

Figure 15:
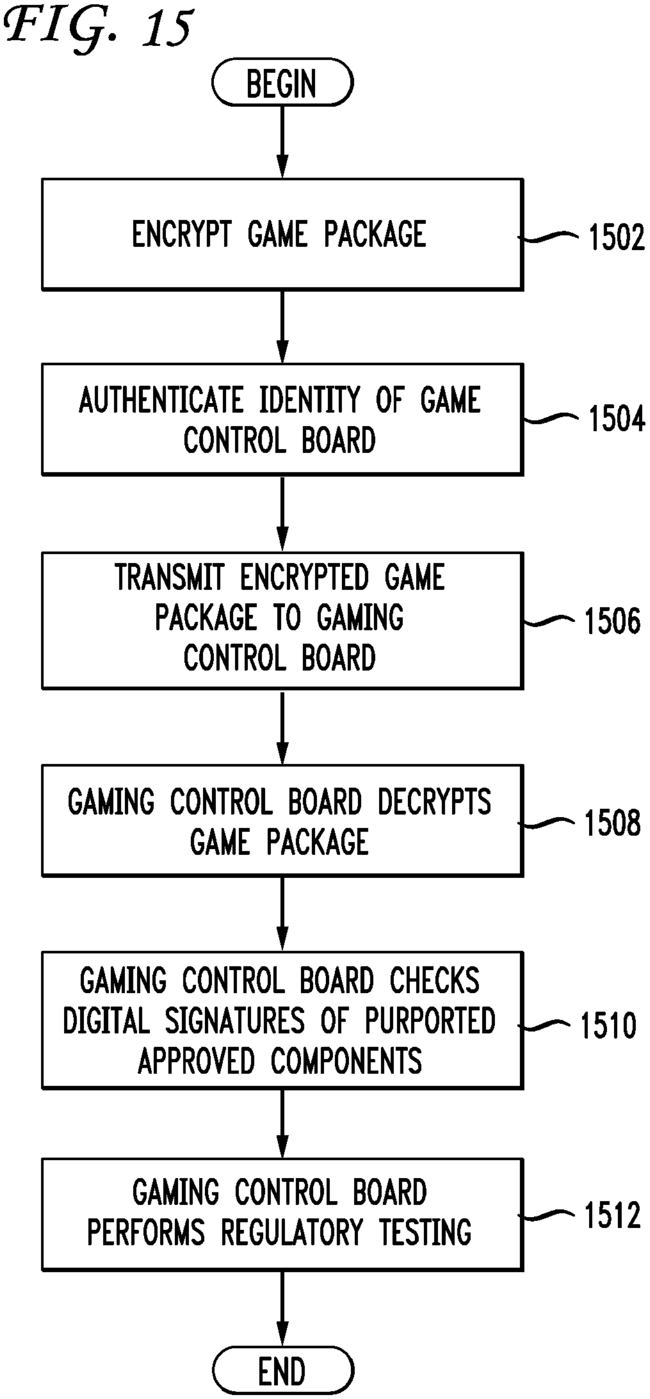
FIG. 15 is a flow diagram of a process of preparing a game package for transmission from a game provider/publisher to a regulatory body.

FIG. 15 is a flow diagram of a process of preparing a game package for transmission from a game provider/publisher to a GCB. The order of the steps provided in the flow diagram of FIG. 2 is not intended to imply a strict order of the process. Some of the steps may be done in a different order than that shown and some of the steps may not be needed in other embodiments or more steps may be needed that are not shown here. At step 1502 the game package created in FIG. 14 is encrypted. Any suitable encryption scheme may be used. For example, the content may be encrypted using a public key for which the corresponding private or secret key is maintained by the GCB where the specific encrypted game package is being sent. Thus, a game package to be sent to x number of GCBs or regulatory bodies may be encrypted x number of times. At step 1504 the identity of the GCB that will be receiving the encrypted game package is authenticated. This is done to ensure that the specific Web server or other component that will be receiving the game package belongs to and is under control of an authenticated and verified GCB entity. This identity authorization and verification may be done in a number of ways, such as by checking the entity's digital certificate. Once the entity's identity has been authenticated and verified, at step 1506 the encrypted game package is finally transmitted over the Internet or other suitable network to the GCB. For example, the final game package may be in the form of a Zip file or in some other suitable format for efficient transmission over the network. In some embodiments, the GCB may specify to the game provider/publisher a particular format in which the game package should be transmitted.

At step 1508 the GCB receives the encrypted game package and decrypts the content. In one embodiment, this is done using the GCB's private key which is known and held only by the authorized GCB. Thus, at this stage the game provider/publisher has verified that the game package has been sent to the intended party and that only the authorized individuals at the intended party (i.e., those who have the private key or other appropriate key) are able to decrypt the package and examine the content. At step 1510 the GCB checks the digital signatures of the game components that are purported by the game submitter to have been previously approved by the GCB. As described above, the GCB has a library of approved gaming components and corresponding digital signatures. The digital signatures of the decrypted gaming components are compared to the stored signatures to verify that they have been approved. At step 1512 the process continues at the GCB which now performs the normal regulatory process for examining the new gaming software. As described above, the process of checking the digital signatures at step 1510 is intended to shorten the normal regulatory testing process at step 1512 by facilitating or expediting scrutiny of components that have already been approved in a prior submission and examination and which may, in many cases, comprise a significant percentage of the total components in the gaming package.

Some networks described herein provide methods and devices for managing one or more networked gaming establishments. Such networks may sometimes be referred to herein as server-based gaming networks, Sb™ networks, or the like. Some such gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines and other devices, such as kiosks, networked gaming tables, player stations, etc.

Relevant information is set forth in U.S. patent application Ser. No. 11/225,407, by Wolf et al., entitled "METHODS AND DEVICES FOR MANAGING GAMING NET- WORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES," in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005, in U.S. patent application Ser. No. 11/078,966 by Nguyen et al., filed Mar. 10, 2005 and entitled "SECURED VIRTUAL NETWORK IN A GAMING ENVIRONMENT," in U.S. patent application Ser. No. 11/173,442 by Kinsley et al., filed Jul. 1, 2005 and entitled "METHODS AND DEVICES FOR DOWNLOADING GAMES OF CHANCE" and in U.S. patent application Ser. No. 11/810,888 by Graham et al., filed Jun. 6, 2007 and entitled "DATABASE QUERIES WITHIN A GAMING MACHINE," all of which are hereby incorporated by reference in their entirety and for all purposes.

Some such networks include devices that provide functionality relating to the present invention. For example, information may conveniently be collected from networked devices, including but not limited to cameras, RFID readers, gaming machines, etc. Such devices, and other devices, may be controlled by servers, host devices, etc., to further the objects of the invention. For example, a camera may be controlled to zoom in and/or higher-resolution images may be acquired for a particular patron of interest. One or more of servers, host devices, cameras or other devices may be configured with software for patron identification, patron tracking, event detection and/or making responses thereto.

Figure 16:
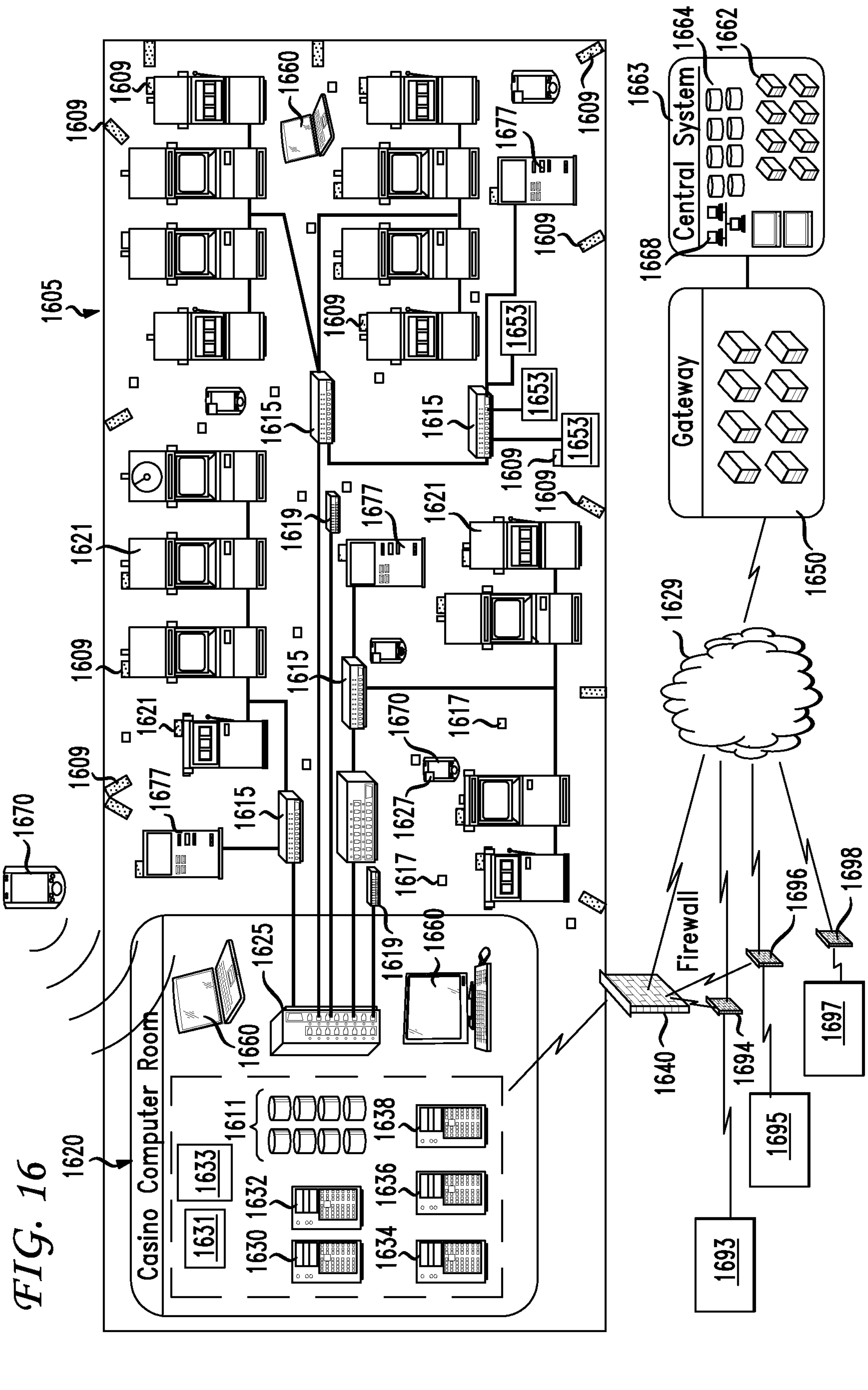
FIG. 16 is a network diagram of one example of a server-based gaming network.

One example of an Sb™ network is depicted in FIG. 16. Those of skill in the art will realize that this architecture and the related functionality are merely examples and that the present invention encompasses many other such embodiments and methods.

Here, casino computer room 1620 and networked devices of a gaming establishment 1605 are illustrated. Gaming establishment 1605 is configured for communication with central system 1663 via gateway 1650. Gaming establishments 1693 and 1695 are also configured for communication with central system 1663.

In some implementations, gaming establishments may be configured for communication with one another. In this example, gaming establishments 1693 and 1695 are configured for communication with casino computer room 1620. Such a configuration may allow devices and/or operators in casino 1605 to communicate with and/or control devices in other casinos. In some such implementations, a server in computer room 1620 may control devices in casino 1605 and devices in other gaming establishments. Conversely, devices and/or operators in another gaming establishment may communicate with and/or control devices in casino 1605.

For example, a server of casino 1605 or central system 1663 may be provisioned with relatively more advanced software (e.g., 3-D facial recognition software) for patron identification than servers of other networked locations. Such a server may process patron identification requests from devices in casino 1605 as well as patron identification requests from devices in gaming establishments 1693 and 1695.

Here, gaming establishment 1697 is configured for communication with central system 1663, but is not configured for communication with other gaming establishments. Some gaming establishments (not shown) may not be in communication with other gaming establishments or with a central system.

Gaming establishment 1605 includes multiple gaming machines 1621, each of which is part of a bank 1610 of gaming machines 1621. In this example, gaming establishment 1605 also includes a bank of networked gaming tables 1653. However, the present invention may be implemented in gaming establishments having any number of gaming machines, gaming tables, etc. It will be appreciated that many gaming establishments include hundreds or even thousands of gaming machines 1621 and/or gaming tables 1653, not all of which are necessarily included in a bank and some of which may not be connected to a network.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,833, entitled "CASHLESS INSTRUMENT BASED TABLE GAME PROMOTIONAL SYSTEM AND METHODOLOGY" and filed on Jun. 15, 2005, U.S. Provisional Patent Application No. 60/858,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,998 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled, and related data may be obtained and/or provided, according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 1653 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,861, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 1605 also includes networked kiosks 1677. Depending on the implementation, kiosks 1677 may be used for various purposes, including but not limited to cashing out, prize redemption, redeeming points from a player loyalty program, redeeming "cashless" indicia such as bonus tickets, smart cards, etc. In some implementations, kiosks 1677 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention.

In this example, each bank 1610 has a corresponding switch 1615, which may be a conventional bank switch in some implementations. Each switch 1615 is configured for communication with one or more devices in computer room 1620 via main network device 1625, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various aspects of the invention. IGT has also developed a gaming-industry-specific transport layer called CASH that rides on top of TCP/IP and offers additional functionality and security.

Here, gaming establishment 1605 also includes an RFID network, implemented in part by RFID switches 1619 and multiple RFID readers 1617. An RFID network may be used, for example, to track objects (such as mobile gaming devices 1670, which include RFID tags 1627 in this example), patrons, etc., in the vicinity of gaming establishment 1605. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, all of which are hereby incorporated by reference.

As noted elsewhere herein, some implementations of the invention may involve "smart" player loyalty instruments, such as player tracking cards, which include an RFID tag. Accordingly, the location of such RFID-enabled player loyalty instruments may be tracked via the RFID network. In this example, at least some of mobile devices 1670 may include an RFID tag 1627, which includes encoded identification information for the mobile device 1670. Accordingly, the locations of such tagged mobile devices 1670 may be tracked via the RFID network in gaming establishment 1605. Other location-detection devices and systems, such as the global positioning system ("GPS"), may be used to monitor the location of people and/or devices in the vicinity of gaming establishment 1605 or elsewhere.

Various alternative network topologies can be used to implement different aspects of the invention and/or to accommodate varying numbers of networked devices. For example, gaming establishments with large numbers of gaming machines 1621 may require multiple instances of some network devices (e.g., of main network device 1625, which combines switching and routing functionality in this example) and/or the inclusion of other network devices not shown in FIG. 16. Some implementations of the invention may include one or more middleware servers disposed between kiosks 1677, RFID switches 1619 and/or bank switches 1615 and one or more devices in computer room 1620 (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

Storage devices 1611, Sb™ server 1630, License Manager 1631, Arbiter 1633, servers 1632, 1634, 1636 and 1638, host device(s) 1660 and main network device 1625 are disposed within computer room 1620 of gaming establishment 1605. In practice, more or fewer devices may be used. Depending on the implementation, some such devices may reside in gaming establishment 1605 or elsewhere.

One or more devices in central system 1663 may also be configured to perform, at least in part, tasks specific to the present invention. For example, one or more servers 1662, storage devices 1664 and/or host devices 1660 of central system 1663 may be configured to implement the functions described in detail elsewhere herein. These functions may include, but are not limited to, communications with and/or collecting data from devices such as cameras 1609, RFID readers 1617, wager gaming machines 1621, gaming tables 1653, mobile devices 1670, etc.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

Some preferred embodiments of Sb™ server 1630 and the other servers shown in FIG. 16 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 1631, servers 1632, 1634, 1636 and 1638, and main network device 1625) are mounted in a single rack with Sb™ server 1630. Accordingly, many or all such devices will sometimes be referenced in the aggregate as an "Sb™ server." However, in alternative implementations, one or more of these devices is in communication with Sb™ server 1630 and/or other devices of the network but located elsewhere. For example, some of the devices could be mounted in separate racks within computer room 1620 or located elsewhere on the network. Moreover, it can be advantageous to store large volumes of data elsewhere via a storage area network ("SAN").

Computer room 1620 may include one or more operator consoles or other host devices that are configured for communication with other devices within and outside of computer room 1620. Such host devices may be provided with software, hardware and/or firmware for implementing various aspects of the invention. However, such host devices need not be located within computer room 1620. Wired host devices 1660 (which are desktop and laptop computers in this example) and wireless devices 1670 (which are PDAs in this example) may be located elsewhere in gaming establishment 1605 or at a remote location.

Some embodiments of the invention include devices for implementing access control, security and/or other functions relating to the communication between different devices on the network. In this example, arbiter 1633 serves as an intermediary between different devices on the network. Arbiter

1633 may be implemented, for example, via software that is running on a server or another networked device. Some implementations of Arbiter 1633 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 1633 is a repository for the configuration information required for communication between devices on the gaming network (and, in some implementations, devices outside the gaming network). Although Arbiter 1633 can be implemented in various ways, one exemplary implementation is discussed in the following paragraphs.

Figure 17:
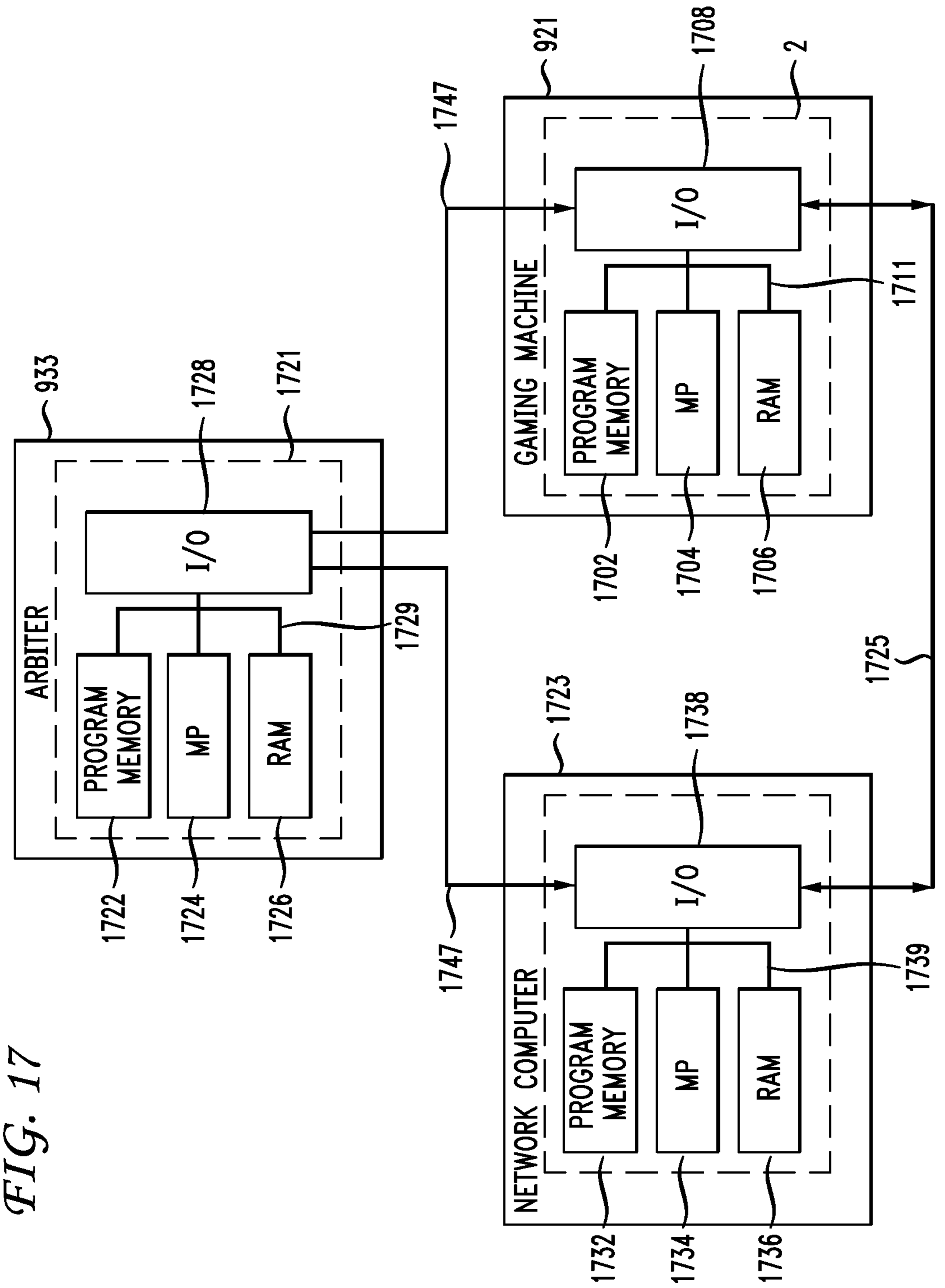
FIG. 17 is a block diagram of a simplified communication topology between a gaming machine, a network computer, and an arbiter.

FIG. 17 is a block diagram of a simplified communication topology between gaming machine 1621, network computer 1723 and Arbiter 1633. Network computer 1723 may be, for example, a server or other device within computer room 1620 or elsewhere. Although only one gaming machine 1621, one network computer 1723 and one Arbiter 1633 are shown in FIG. 17, it should be understood that the following examples may be applicable to different types of networked devices in addition to gaming machine 1621 and network computer 1723, and may include different numbers of network computers 1723, Arbiters 1633 and gaming machines 1621. For example, a single Arbiter 1633 may be used for secure communications among a plurality of network computers 1723 and tens, hundreds or thousands of gaming machines 1621. Likewise, multiple Arbiters 1633 may be utilized for improved performance and other scalability factors.

Referring to FIG. 17, the Arbiter 1633 may include an arbiter controller 1721 that may comprise a program memory 1722, a microcontroller or microprocessor (MP) 1724, a random-access memory (RAM) 1726 and an input/output (I/O) circuit 1728, all of which may be interconnected via an address/data bus 1729. The network computer 1723 may also include a controller 1731 that may comprise a program memory 1732, a microcontroller or microprocessor (MP) 1734, a random-access memory (RAM) 1736 and an input/output (I/O) circuit 1738, all of which may be interconnected via an address/data bus 1739. It should be appreciated that although the Arbiter 1633 and the network computer 1723 are each shown with only one microprocessor 1724, 1734, the controllers 1721, 1731 may each include multiple microprocessors 1724, 1734. Similarly, the memory of the controllers 1721, 1731 may include multiple RAMs 1726, 1736 and multiple program memories 1722, 1732. Although the I/O circuits 1728, 1738 are each shown as a single block, it should be appreciated that the I/O circuits 1728, 1738 may include a number of different types of I/O circuits. The RAMs 1724, 1734 and program memories 1722, 1732 may be implemented as semiconductor memories, magnetically readable memories, and/or optically readable memories, for example.

Although the program memories 1722, 1732 are shown in FIG. 17 as read-only memories (ROM) 1722, 1732, the program memories of the controllers 1721, 1731 may be a read/write or alterable memory, such as a hard disk. In the event a hard disk is used as a program memory, the address/data buses 1729, 1739 shown schematically in FIG. 17 may each comprise multiple address/data buses, which may be of different types, and there may be an I/O circuit disposed between the address/data buses.

As shown in FIG. 17, the gaming machine 1621 may be operatively coupled to the network computer 1723 via the data link 1725. The gaming machine 1621 may also be operatively coupled to the Arbiter 1633 via the data link 1749, and the network computer 1723 may likewise be operatively coupled to the Arbiter 1633 via the data link 1747.

Communications between the gaming machine 1621 and the network computer 1723 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the Arbiter 1633 may verify the authenticity of devices in the gaming network, including but not limited to devices sending queries and/or remote procedure calls to gaming machines. The Arbiter 1633 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 1633 may provide encryption keys (session keys) for the communication session to the client via the secure communication channel. Either the host and/or the session key may be provided in response to the request, or may have been previously provided. The client may contact the host to initiate the communication session. The host may then contact the Arbiter 1633 to determine the authenticity of the client. The Arbiter 1633 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 1633 may contact the host regarding the request and provide corresponding session keys to both the client and the host. The Arbiter 1633 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Referring again to FIG. 16, the communication link(s) between casino 1605 and central system 1663 preferably have ample bandwidth and may, for example, comprise one or more T1 or T3 connections and/or satellite links having comparable bandwidth, etc. Network 1629 is the Internet in this example. However, it will be understood by those of skill in the art that network 1629 could include any one of various types of networks, such as the public switched telephone network ("PSTN"), a satellite network, a wireless network, a metro optical transport, etc. Accordingly, a variety of protocols may be used for communication on network 1629, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices (such as firewalls, authentication and/or encryption) should be deployed in order to prevent the unauthorized access of the gaming network.

Similarly, any other connection between gaming network 1605 and the outside world should only be made with trusted devices via a secure link, e.g., via a virtual private network ("VPN") tunnel. For example, the illustrated connection between Sb™ server 1630, gateway 1650 and central system 1663 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN #0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

Alternatively, a permanent virtual circuit ("PVC") can be established to provide a dedicated and secure circuit link between two facilities, e.g., between a casino and central system 1663. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from casino 1605) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, information transmitted to, on or from a gaming establishment may be encrypted. In one implementation, the information may be symmetrically encrypted using a symmetric encryption key, where the symmetric encryption key is asymmetrically encrypted using a private key. The public key may, for example, be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing secure connections between devices in a gaming network, such as the connections between the local devices of the gaming network 1605 and central system 1663, allows for the deployment of many advantageous features. For example, a customer (e.g., an employee of a gaming establishment) may be able to log onto an account of central system 1663 to obtain the account information such as the customer's current and prior account status. Automatic updates of a customer's software may also be enabled. For example, central system 1663 may notify one or more devices in gaming establishment 1605 regarding new products and/or product updates. For example, central system 1663 may notify server (or other device) in computer room 1620 regarding new software, software updates, the status of current software licenses, etc. Alternatively, such updates could be automatically provided to a server in computer room 1620 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 463, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 1663 and gaming machines in multiple gaming establishments. For example, new or updated software may be obtained by a server in one gaming establishment and distributed to gaming machines in that gaming establishment and/or other gaming establishments. A server in one gaming establishment may perform services, such as patron identification services, in response to a request from a device in another gaming establishment.

Figure 18:
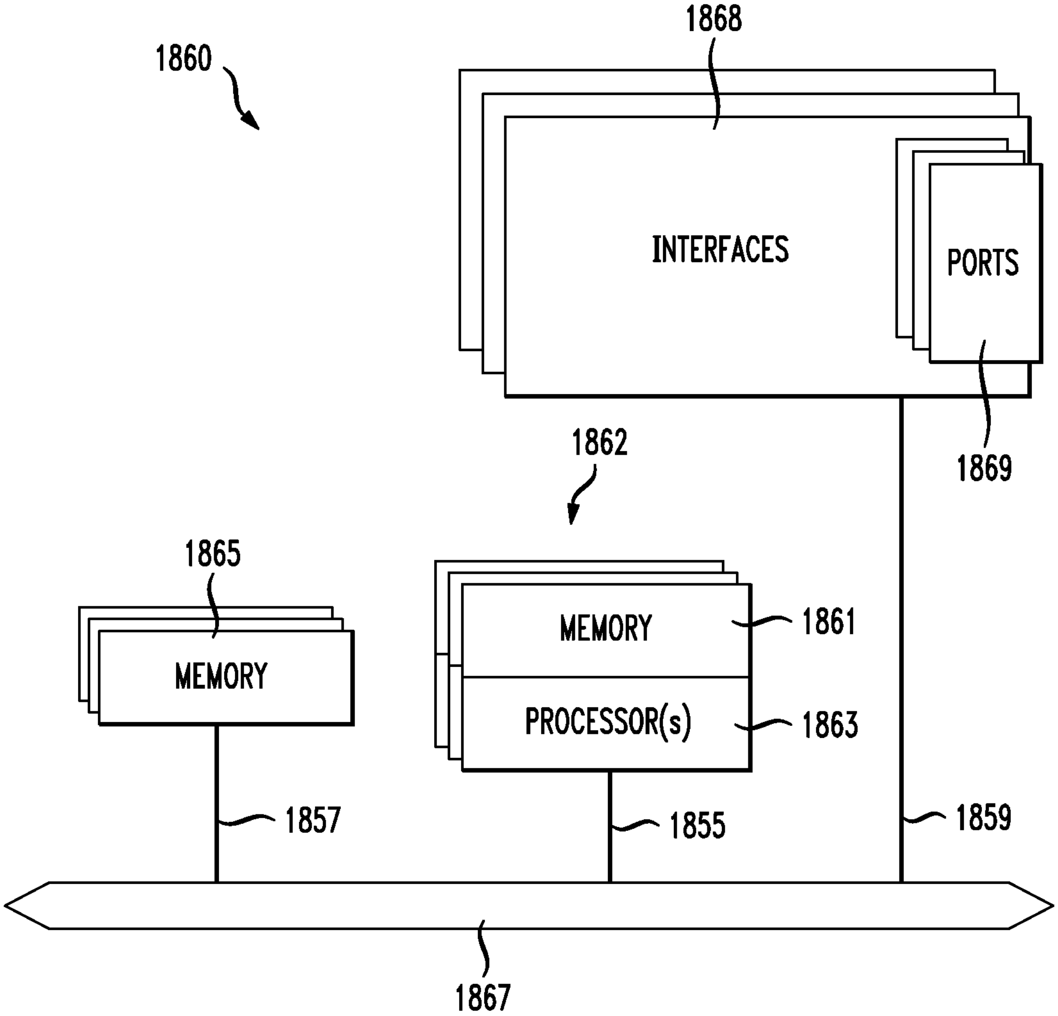
FIG. 18 is a block diagram of an example of a network device that may be configured for implementing some methods of the present invention.

FIG. 18 illustrates an example of a network device that may be configured for implementing some methods of the present invention. Network device 1860 includes a master central processing unit (CPU) 1862, interfaces 1868, and a bus 1867 (e.g., a PCI bus). Generally, interfaces 1868 include ports 1869 appropriate for communication with the appropriate media. In some embodiments, one or more of interfaces 1868 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1868 control such communications-intensive tasks as encryption, decryption, compression, decompression, packetization, media control and management. By providing separate processors for the communications-intensive tasks, interfaces 1868 allow the master microprocessor 1862 efficiently to perform other functions such as routing computations, network diagnostics, security functions, etc.

The interfaces 1868 are typically provided as interface cards (sometimes referred to as "linecards"). Generally, interfaces 1868 control the sending and receiving of data packets over the network and sometimes support other peripherals used with the network device 1860. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1862 may be responsible for implementing specific functions associated with the functions of a desired network device. According to some embodiments, CPU 1862 accomplishes all these functions under the control of software including an operating system and any appropriate applications software.

CPU 1862 may include one or more processors 1863 such as a processor from the Motorola family of microprocessors or the MIPS family of microprocessors. In an alternative embodiment, processor 1863 is specially designed hardware for controlling the operations of network device 1860. In a specific embodiment, a memory 1861 (such as non-volatile RAM and/or ROM) also forms part of CPU 1862. However, there are many different ways in which memory could be coupled to the system. Memory block 1861 may be used for a variety of purposes such as, for example, caching and/or storing data, programming instructions, etc.

Regardless of network device's configuration, it may employ one or more memories or memory modules (such as, for example, memory block 1865) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 18 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 18) or switch fabric based (such as a cross-bar).

While the invention has been particularly shown and described with reference to specific embodiments thereof, it will be understood by those skilled in the art that changes in the form and details of the disclosed embodiments may be made without departing from the spirit or scope of the invention. For example, embodiments have been described in which game developer may employ preexisting game templates to construct new games. However, it will be understood that embodiments in which such games are developed without such templates are within the scope of the invention. In addition, the host of a game development environment implemented according to the present invention does not necessarily need to be a gaming machine provider or manufacturer to remain within the scope of the invention. And as discussed above, any of a wide range of technologies may be employed to implement and provide access to such a game development environment.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A wager game creation and regulatory body submission system comprising:

a creative environment hosted on a server, which can be accessed by a game developer for developing wager game code;

a production environment hosted on the server, in which services are performed on the wager game code, wherein the services relate to wager game code platform conversion such that the wager game code can be executed on multiple types of server-based gaming platforms or multiple types of electronic gaming machines manufactured by different manufacturers, and wherein the services further relate to modification of the wager game code for compliance purposes, and wager game code testing;

a submission environment hosted on the server, in which the wager game code and submission documents are bundled into a game package in preparation for submission to a regulatory body, wherein:

the creative environment, the production environment, and the submission environment are provided by a game provider or publisher, and the game package includes one or more items required for regulatory body approval and one or more voluntary items, the one or more voluntary items not required for regulatory body approval and included based on expertise and experience of the game provider or publisher to facilitate regulatory approval, wherein the game package includes a differences report showing differences between the wager game code and a plurality of previously approved game components incorporated into the wager game code;

a memory for storing a library of regulatory body approved game components;

wherein:

the library of regulatory body approved game components is configured to be accessible to the creative environment, the creative environment has a game creation memory area for facilitating wager game code development by the game developer, and the creative environment has an interface for use by the game developer.

2. A wager game system as recited in claim 1, wherein the creative environment includes a technical feasibility testing module for performing technical and software engineering tests on the wager game code for operation stability and robustness.

3. A wager game system as recited in claim 1, wherein the production environment includes a compliance module having a regulation component for ensuring that the wager game code converted for a specific jurisdiction complies with regulations for the specific jurisdiction and a standards component for ensuring that the wager game code converted for the specific jurisdiction complies with standards for the jurisdiction.

4. A wager game system as recited in claim 1, wherein the production environment includes a market feasibility testing module for preparing the wager game code so that the code can be tested in an actual gaming environment.

5. A wager game system as recited in claim 1, wherein the production environment includes a compatibility module for ensuring that wager game code that has been converted to execute on a specific platform is compatible on the specific platform.

6. A wager game system as recited in claim 5, wherein the specific platform is a server-based gaming network.

7. A wager game system as recited in claim 1, wherein the game developer develops wager game code using existing game code components provided by a game provider or publisher.

8. A wager game system as recited in claim 7, wherein the existing game code components include components approved by at least one gaming regulatory body.

9. A wager game system as recited in claim 7, wherein the existing game code components include components that are proprietary to the game provider or publisher.

10. A wager game system as recited in claim 1, wherein the creative environment includes a game creation memory area providing a workspace for the game developer.

11. A wager game system as recited in claim 1, wherein the production environment includes a platform conversion module for converting the wager game code so that the code executes on one or more server-based gaming networks.

12. A wager game system as recited in claim 11, wherein the wager game code is converted for execution on the one or more server-based gaming networks by a platform conversion network sub-module.

13. A wager game system as recited in claim 11, wherein the production environment includes a gaming machine conversion module for converting the wager game code so that the code executes on one or more gaming machines in a server-based gaming network.

14. A wager game system as recited in claim 13, wherein the wager game code is converted for execution on the one or more gaming machines by a gaming machine conversion sub-module.

15. A wager game system as recited in claim 1, wherein the submission environment includes a document production module for creating regulatory body submission documents.

16. A wager gaming system as recited in claim 1, wherein one of the regulatory body submission is a compliance certificate document which contains a statement by a game submitter that the game package being submitted complies with the regulations of the regulatory body.

17. A wager gaming system as recited in claim 1, wherein the submission environment includes a security module for authenticating the regulatory body thereby ensuring that the game package is being sent to an authorized entity.

18. A wager gaming system as recited in claim 1, wherein the submission environment includes a digital certificate management component to ensure that only authorized individuals at the regulatory body can decrypt the game package.

19. A wager gaming system as recited in claim 1, wherein the library of regulatory body approved game components includes pay tables, audio components, visual components, symbols, and a plurality of game logic modules.

20. A wager game production system as recited in claim 1, further comprising a digital signatures area.

21. A wager game production system as recited in claim 1, further comprising an authentication module having a key management component.

22. A wager game production system as recited in claim 1, further comprising digital signatures of each gaming control board ("GCB")-approved game component in a database of GCB-approved game components.

23. A wager game production system as recited in claim 1, wherein the document production module further comprises a compliance certificate creation submodule.

24. A method of creating a wager game, comprising:

providing access to a game provider host system, wherein the access is provided by a game provider or publisher to a game developer;

enabling development of a wager game in a workspace in the host system by allowing a game developer to access and use gaming control board ("GCB")-approved game components, wherein control of the GCB-approved components is maintained by the game provider or publisher;

importing developed wager game code associated with the wager game from the workspace to a testing environment;

performing game feasibility and market testing on the wager game;

converting the developed wager game code such that the wager game code can be executed on multiple types of server-based gaming platforms or multiple types of electronic gaming machines manufactured by different manufacturers;

determining appropriate gaming jurisdictions for the wager game;

creating a differences report providing differences between the GCB-approved components and components in the developed wager game code;

determining, for each GCB associated with each of the determined appropriate gaming jurisdictions, one or more items required to be included in a game package for GCB approval of the game package in the associated appropriate gaming jurisdictions;

determining one or more voluntary items that are not required to be included in a game package for GCB approval of the game package and that, based on the expertise and experience of the game provider or publisher, facilitate GCB approval of the game package; and creating a plurality of GCB-specific game packages based on the determined appropriate jurisdictions, each GCB-specific game package specific to a particular GCB in the determined appropriate gaming jurisdictions and including the one or more items required for GCB approval by the particular GCB and at least one of the one or more voluntary items, wherein each GCB-specific game package includes the differences report.

25. A method as recited in claim 24, wherein creating a plurality of GCB-specific game packages further comprises creating documentation required by a specific GCB.

26. A method as recited in claim 25, further comprising accessing a GCB variant module maintained by the game provider or publisher.

27. A method as recited in claim 24, wherein creating a plurality of GCB-specific game packages further comprises generating GCB-specific game submission packages for a plurality of gaming platforms and a plurality of devices.

28. A method as recited in claim 24, further comprising encrypting the digital signature of a GCB-specific game package using a GCB-specific public key.

29. A method as recited in claim 28, further comprising electronically transmitting the encrypted game package to a specific GCB.

30. A method as recited in claim 29, further comprising authenticating the identity of the specific GCB.

31. A method as recited in claim 29, wherein the GCB checks signatures of GCB-approved components.

32. A method as recited in claim 24, wherein creating a plurality of GCB-specific game packages based on the determined appropriate jurisdictions further comprises creating a compliance certificate associated with the wager game, the certificate corresponding to compliance with one or more of the determined appropriate jurisdictions.

33. A method as recited in claim 24, further comprising converting developed wager game code to one or more modified versions thereby rendering the developed wager game code suitable for execution on various gaming devices.

34. A method as recited in claim 24, further comprising generating a digital signature of a game submission package.

35. A method of developing new wager game code and submitting the code to a gaming regulatory body, the method comprising:

providing access to a game developer to use pre-approved gaming components, thereby enabling the game developer to create wager game code;

testing the wager game code for technical and operational stability in a testing environment;

converting the wager game code such that the wager game code can operate on multiple types of server-based gaming platforms or multiple types of electronic gaming machines manufactured by different manufacturers;

converting the wager game code to comply with requirements of a gaming regulatory jurisdiction;

creating a differences report providing differences between approved gaming components and components in the development of wager game code;

determining one or more items required for gaming control board ("GCB") approval within the gaming regulatory jurisdiction;

determining one or more voluntary items that, based on the expertise and experience of a game provider or publisher, facilitate GCB approval and that are not required by the GCB; and creating a game package based on requirements of the gaming jurisdiction, the game package including the one or more items required for GCB approval and the one or more voluntary items, wherein the game package includes the differences report.

36. A method as recited in claim 35, wherein the gaming components arc preapproved by a GCB.

37. A method as recited in claim 35, further comprising determining the gaming regulatory jurisdiction for the wager game code.

38. A method as recited in claim 35, wherein the method follows a Services-Oriented Architecture approach.

* * * * *